(12) United States Patent
Kawasaki

(10) Patent No.: US 8,716,906 B2
(45) Date of Patent: May 6, 2014

(54) ELECTRONIC CIRCUIT DEVICE INCLUDING A NOISE BLOCKER

(75) Inventor: Kenichi Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 917 days.

(21) Appl. No.: 12/271,735

(22) Filed: Nov. 14, 2008

(65) Prior Publication Data

US 2009/0127931 A1 May 21, 2009

(30) Foreign Application Priority Data

Nov. 15, 2007 (JP) ................. 2007-296685

(51) Int. Cl.
*H02J 1/06* (2006.01)
(52) U.S. Cl.
USPC .......................................... 307/140; 714/817
(58) Field of Classification Search
USPC .......................................... 307/140; 714/817
See application file for complete search history.

(56) References Cited

U.S. PATENT DOCUMENTS

| 6,314,028 B1 | 11/2001 | Kono |
| 6,373,149 B1 * | 4/2002 | Podlesny et al. ............... 307/28 |
| 6,721,903 B2 * | 4/2004 | Yoshioka et al. ............... 714/10 |
| 2004/0117678 A1 * | 6/2004 | Soltis et al. .................. 713/320 |

FOREIGN PATENT DOCUMENTS

| JP | 05-268065 A | 10/1993 |
| JP | 06-29834 A | 2/1994 |
| JP | 2002-25266 A | 1/2002 |
| JP | 2006-173889 A | 6/2006 |

* cited by examiner

*Primary Examiner* — Fritz M Fleming
(74) *Attorney, Agent, or Firm* — Fujitsu Patent Center

(57) ABSTRACT

An electric circuit device operable under a first power supply includes: a first circuit; a switch connecting the first circuit with the first power supply; a second circuit for producing a signal output; a control signal output unit for outputting a control signal in accordance with the signal output of the second circuit, wherein while the first circuit is supplied with a first power supply voltage via the switch by supplying of a driving voltage to the switch, the supply of the driving voltage is temporality cut off in response to the control signal.

11 Claims, 28 Drawing Sheets

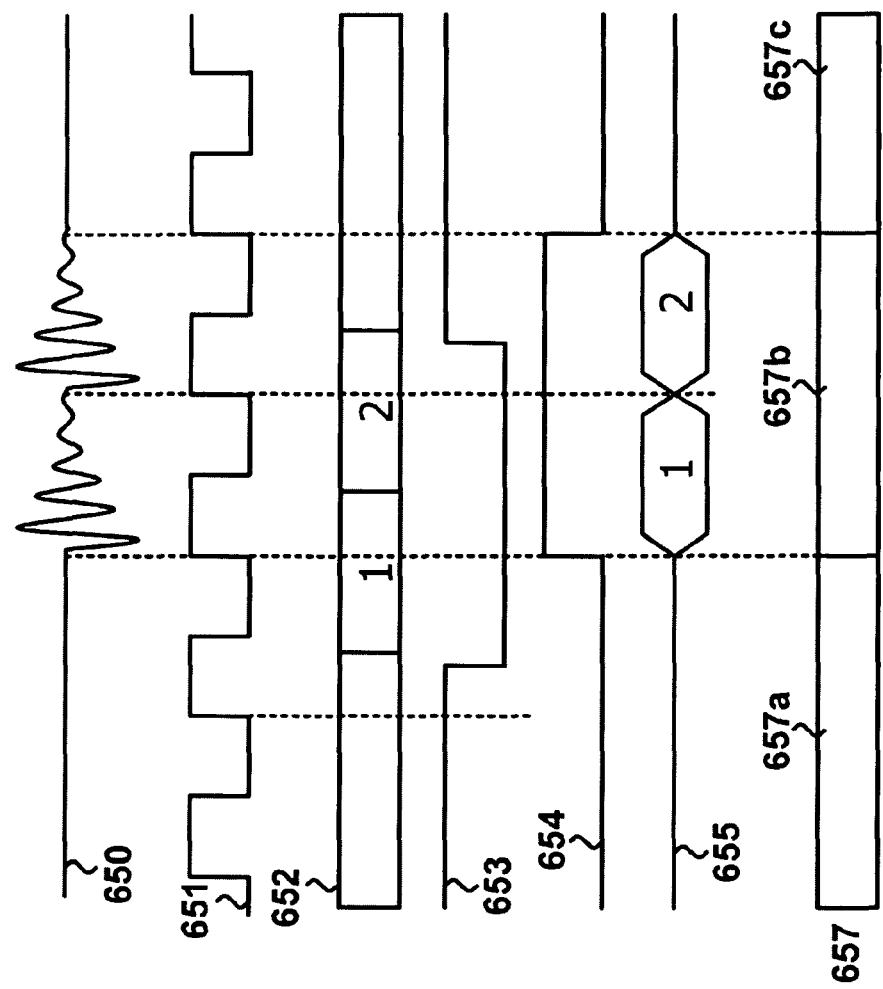

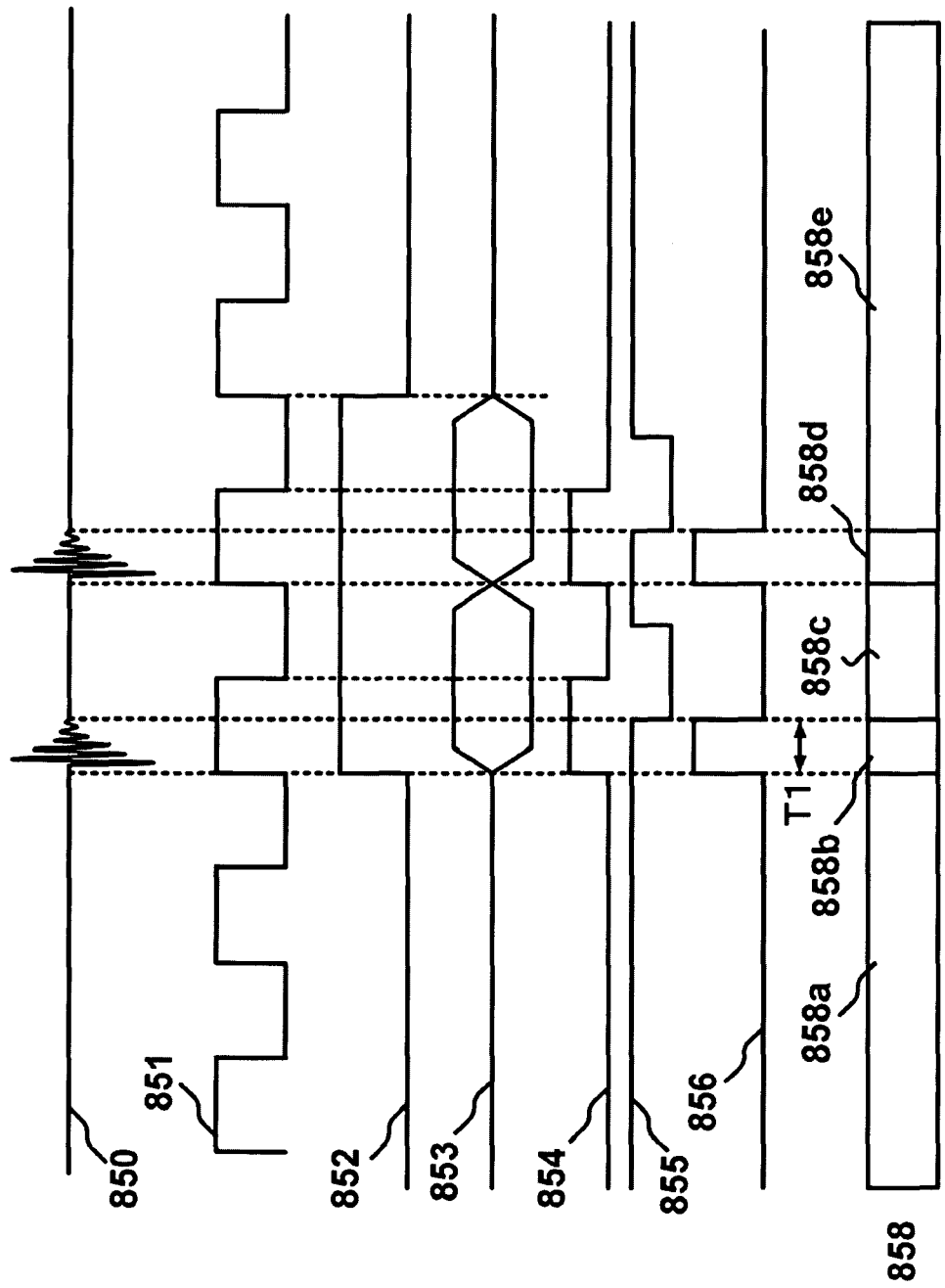

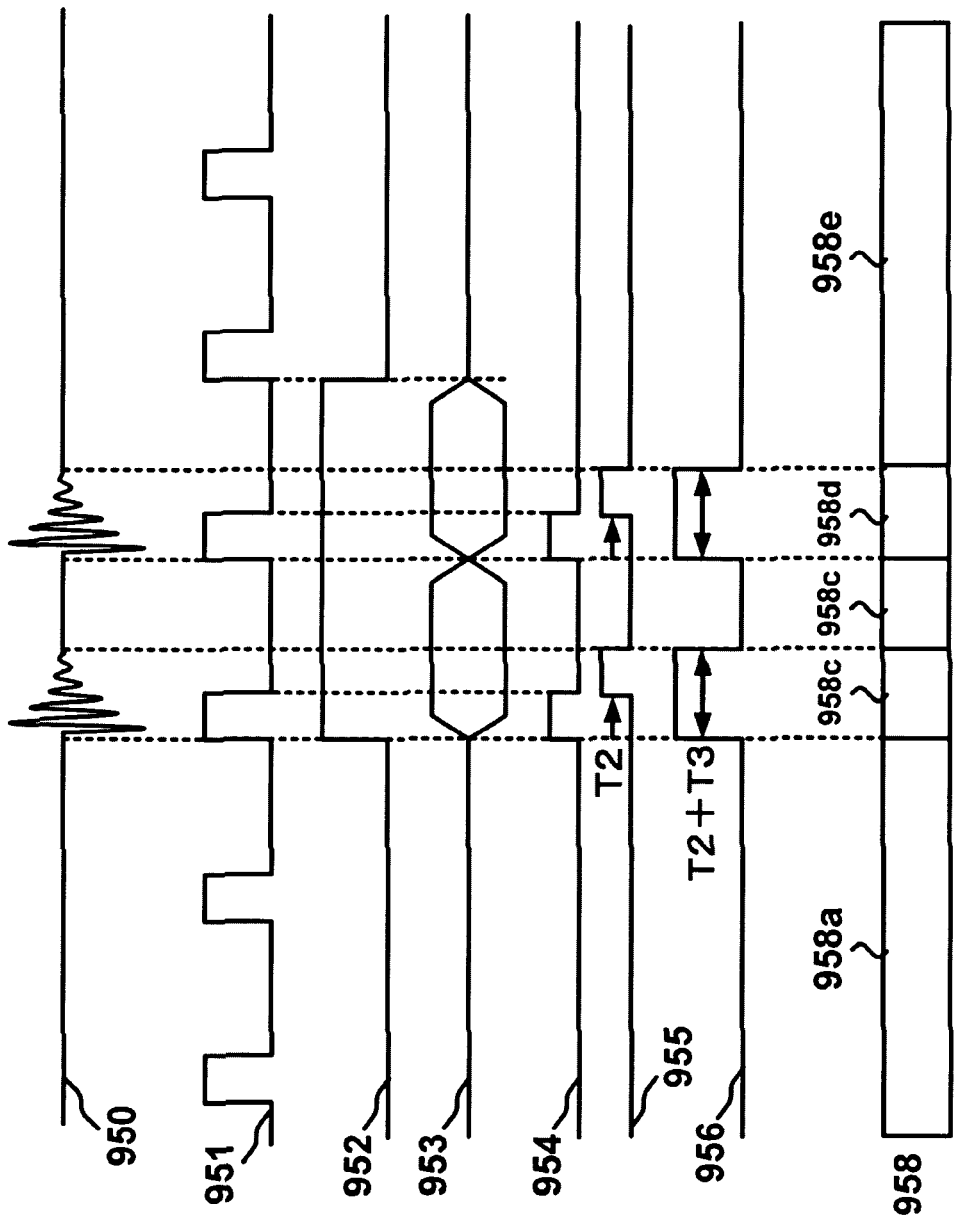

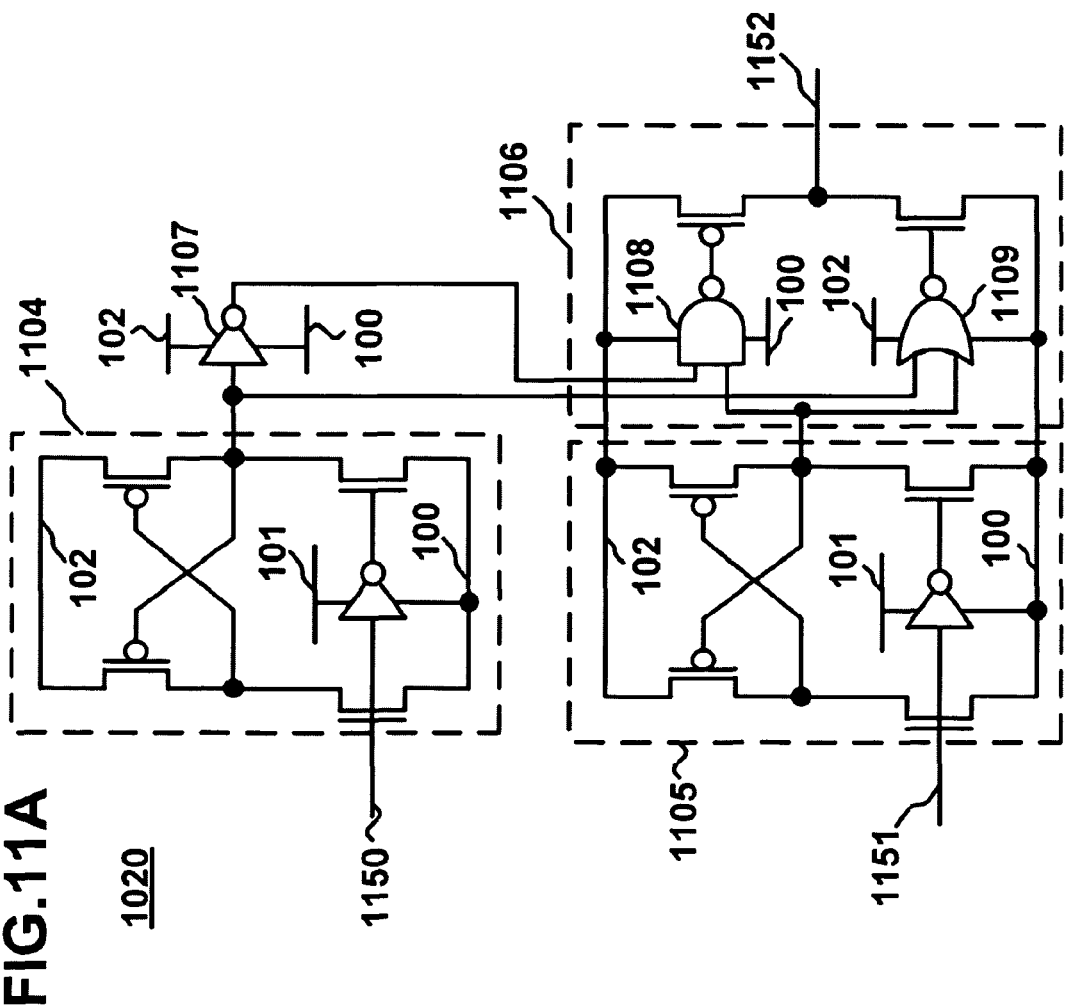

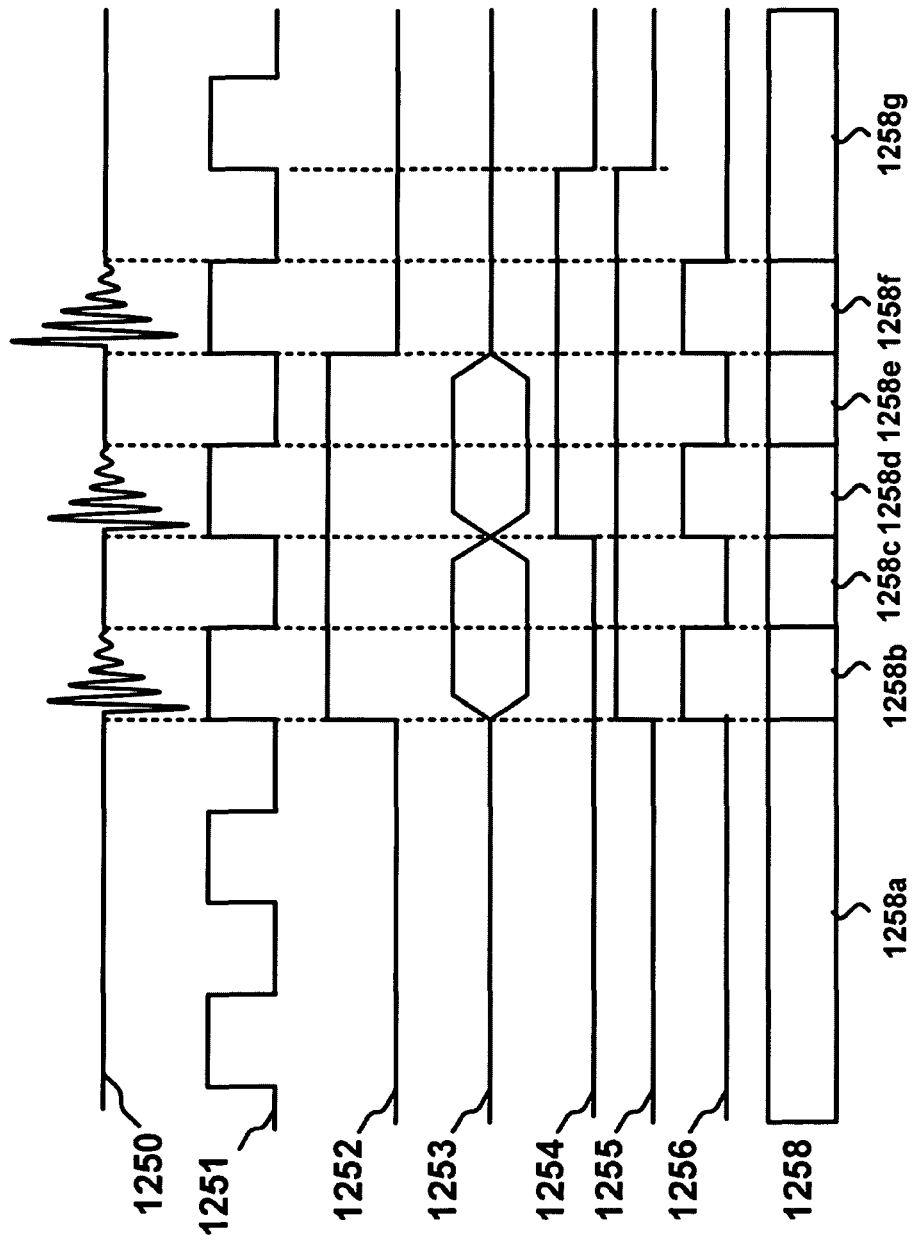

FIG.13B

| clock mode | | | |
|---|---|---|---|
| Mode | c1 | c0 | 1300 |
| m1 | 0 | 0 | 1201 |
| m2 | 0 | 1 | 1301 |
| m3 | 1 | 0 | 1302 |

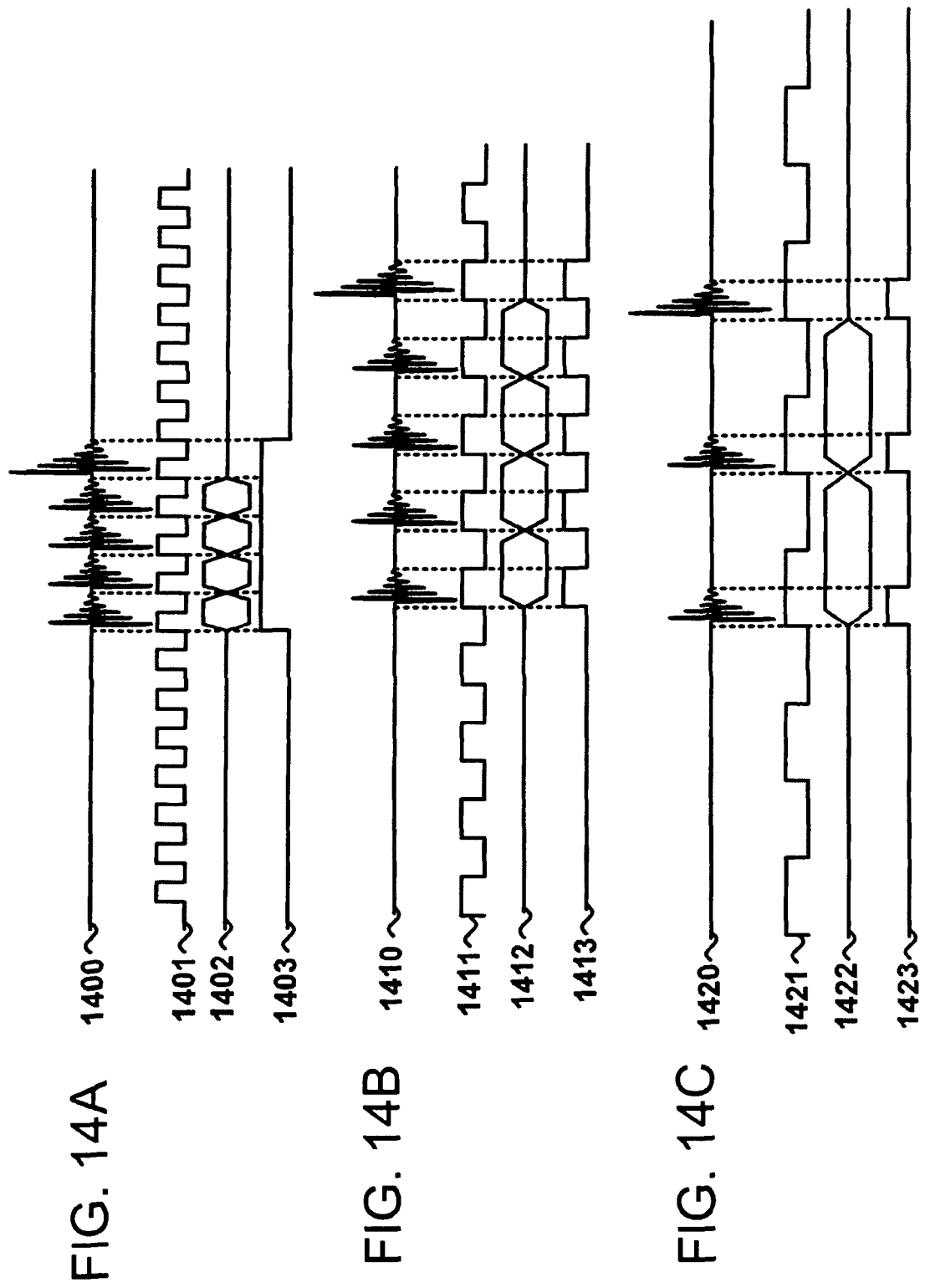

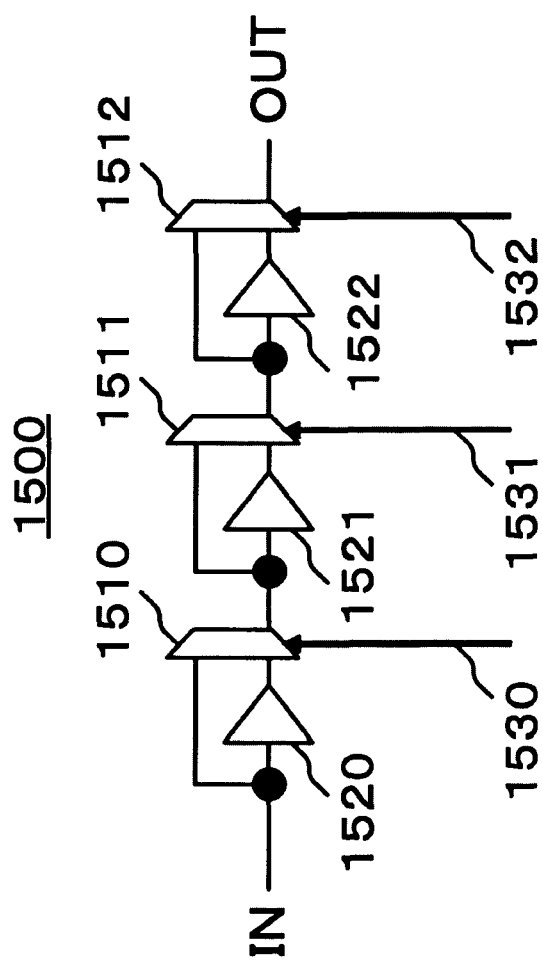

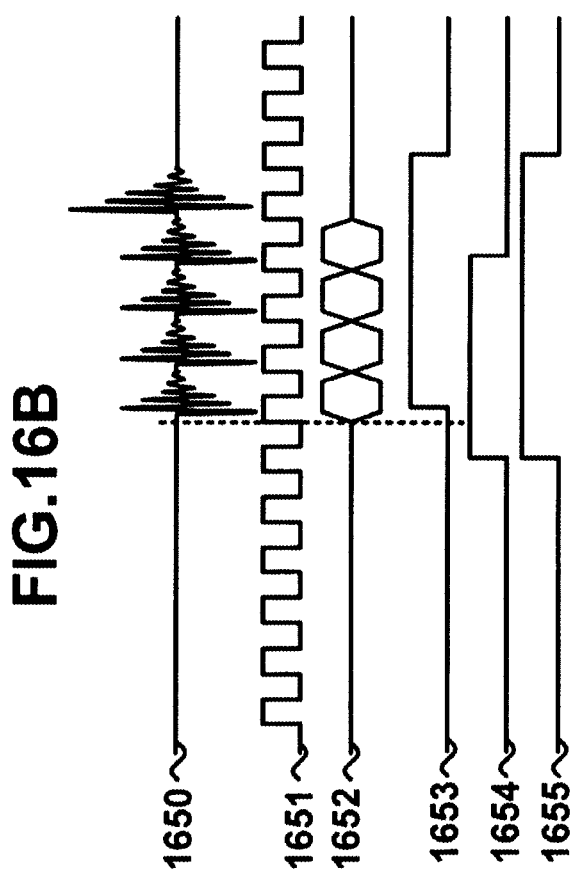

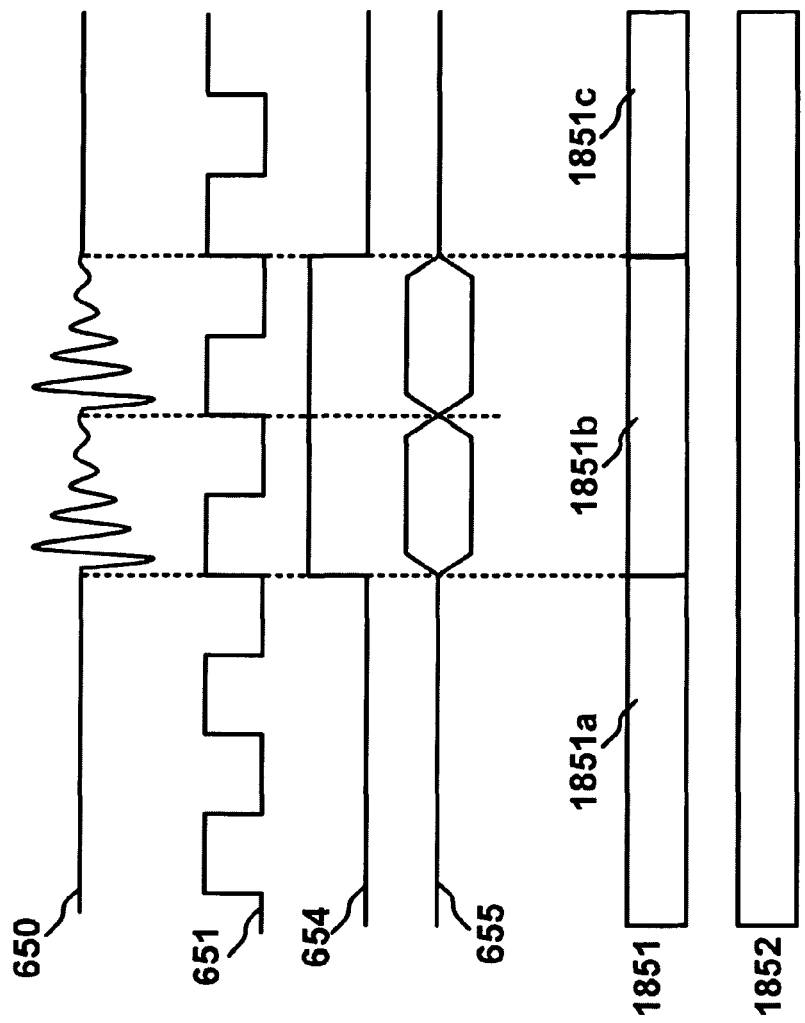
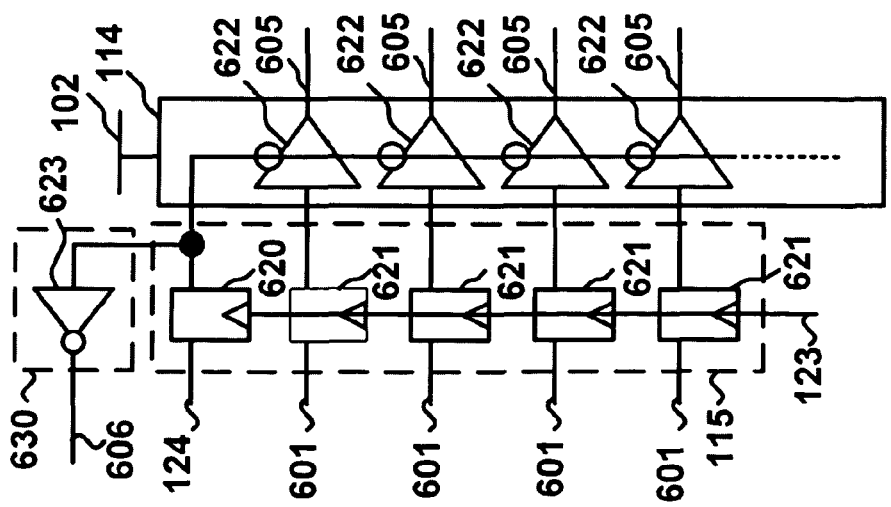

ELECTRONIC CIRCUIT DEVICE INCLUDING A NOISE BLOCKER

CROSS-REFERENCE TO RELATED APPLICATION

This application is based upon and claims the benefit of priority of the prior Japanese Patent Application No. 2007-296685 filed on Nov. 15, 2007, the entire contents of which are incorporated herein by reference.

BACKGROUND

1. Field

This art is related to an electronic circuit device having a power-gating function.

2. Description of the Related Art

One of the functions to reduce power consumption of semiconductor integrated circuits used for electronic devices is a power-gating function. A power-gating function stops supplying electronic power to a domain of an internal circuit that is in a standby mode. In this way, power consumption can be minimized when the domain is in a standby mode, thus increasing the continuous operating time of electronic devices.

A high threshold transistor can be used for a switch for shutting off the power. A high threshold transistor has an excellent ratio of driving an electrical current when a switch is on to a small leakage current when the switch is off. In order to drive such a high threshold transistor, Japanese Patent Application Laid-open No. 6-29834, for example, describes a switching control unit that controls a switching operation using a second power supply voltage higher than a first power supply voltage used for an internal circuit.

In widely used large-scale integrations (LSIs), the power supply voltage for an I/O circuit is higher than that for an internal circuit. Accordingly, a power supply of an I/O circuit is used for a power supply of the switching control unit. However, in such a case, simultaneous switching noise caused by simultaneous switching of the I/O circuit (known as simultaneous switching output (SSO) noise) is transferred to the switching control unit, which is problematic. By using the second power supply of the I/O circuit for the power supply of the switching control unit, SSO noise caused in the I/O circuit affects superposed on a switch control signal for controlling a switching operation of the high threshold transistor. Therefore, the switching operation of the high threshold transistor becomes unstable. As a result, the operation of the internal circuit operating with the first power supply supplied via the high threshold transistor becomes unstable.

SUMMARY

According to an aspect of an embodiment, an electric circuit device operable under a first power supply includes: a first circuit; a switch connecting the first circuit with the first power supply; a second circuit for producing a signal output; a control signal output unit for outputting a control signal in accordance with the signal output of the second circuit, wherein while the first circuit is supplied with a first power supply voltage via the switch by supplying of a driving voltage to the switch, the supply of the driving voltage is temporarily cut off in response to the control signal.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6A shows a circuit diagram for outputting a control signal when SSO noise is generated;
FIG. 6B shows a waveform diagram;
FIG. 8B shows a waveform diagram;
FIG. 9B shows a waveform diagram;
FIG. 11A shows a detailed circuit diagram of the output circuit;
FIG. 11B shows a truth table of the output circuit;
FIG. 12B shows a waveform diagram;
FIG. 13B shows a truth table used by the selector;
FIG. 14A shows a waveform diagram;
FIG. 14B shows a waveform diagram;
FIG. 14C shows a waveform diagram;
FIG. 15A shows a circuit diagram of a circuit for changing the delay times of the delay circuits;
FIG. 15B shows a truth table used by the delay circuits;
FIG. 16B shows a waveform diagram;
FIG. 18A shows a circuit diagram illustrating the operation of the noise blocker;
FIG. 18B shows a waveform diagram.

DESCRIPTION OF THE PREFERRED EMBODIMENTS

Various exemplary embodiments are described below with reference to the accompanying drawings. It should be appreciated that the embodiments are only examples, and are not intended to limit the scope, applicability, or configuration of the invention in any way.

Figure 1:
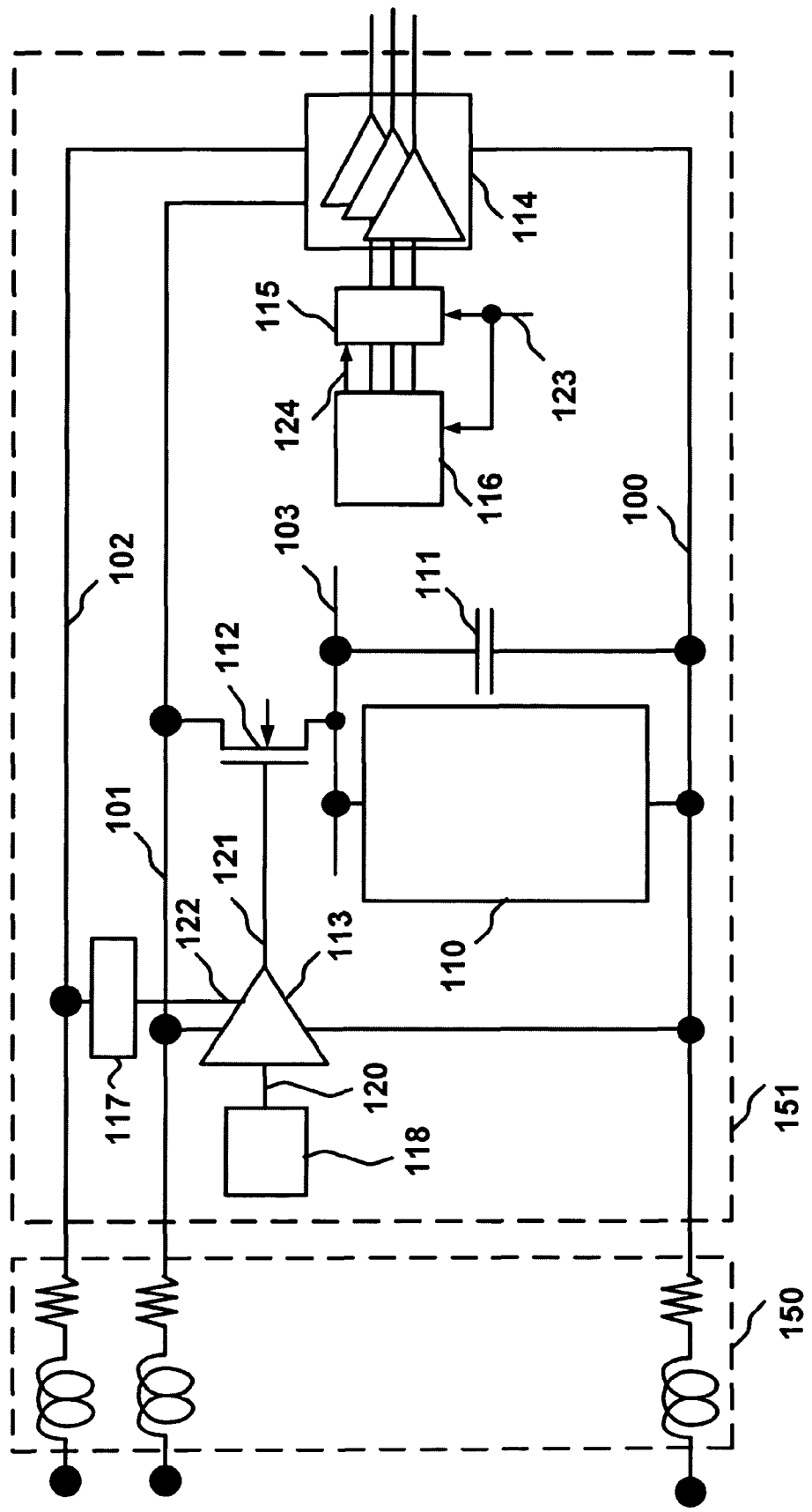
FIG. 1 shows a semiconductor device.

FIG. 1 shows a semiconductor device according to an embodiment. While the present embodiment is described with reference to a semiconductor device, the present embodiment is not limited thereto, but the present embodiment is applicable to a wide variety of electronic circuit devices.

A semiconductor device includes a package equivalent circuit 150 and a semiconductor circuit 151. The package equivalent circuit 150 represents a lead frame of a package portion of the semiconductor device in the form of an equivalent circuit using an inductance component and a resistance component. The semiconductor device further includes interconnection lines 100, 101, and 102 for receiving power. A first power supply based on the interconnection line 100 is connected to the interconnection line 101. A second power supply based on the interconnection line 100 is connected to the interconnection line 102. The semiconductor circuit 151 includes a circuit 110, a circuit 114, a circuit 115, a circuit 116, a capacitor element 111, a switch 112, a switch control unit 113, and a noise blocker 117. The switch control unit 113 and the noise blocker 117 are collectively referred to as a "power supply control unit". The circuit 110 and the capacitor element 111 are connected between the interconnection line 103 and the interconnection line 100. The circuit 114, the circuit 115, and the circuit 116 are connected between the interconnection line 102 and the interconnection line 100. The circuit 114 functions as an input and output buffer of the semiconductor device. The circuit 115 functions as an output port unit. The circuit 116 functions as an input and output controller. The circuit 115 and the circuit 116 operate in synchronization with a clock signal 123. The circuit 115 temporarily stores a signal transmitted from the circuit 116. In addition, in response to an output enable signal 124 output from the circuit 116, the circuit 115 transmits a hold signal to the circuit 114 in synchronization with the clock signal 123. The circuit 114 level-converts the input hold signal into a second power supply voltage using a level shifter and outputs the converted signal. At that time, since the level shifter having a strong driving capability simultaneously performs a switching operation, SSO noise is superposed on the interconnection line 102 for supplying the second power supply.

For example, the switch 112 is composed of a high threshold N-channel MOS transistor. The switch 112 is connected between the interconnection line 101 and the interconnection line 103. The switch control unit 113 receives a signal 120 and outputs a switch control signal 121. The signal 120 is a driving voltage output from a power management unit (PMU) 118. In response to an input instruction, the PMU 118 controls supply of power to the circuit 110. The second power supply is connected to the switch control unit 113 using an interconnection line 122. The switch control unit 113 level-converts the signal 120 from the first power supply voltage to the second power supply voltage so as to output the driving voltage 121. In this way, the switch control unit 113 can perform control so that the switch 112, which is a high threshold transistor, operates stably.

The noise blocker 117 is connected between the interconnection line 102 and the switch control unit 113. The noise blocker 117 prevents SSO noise generated in the circuit 114 from being superposed on the driving voltage 121 output from the switch control unit 113 via the interconnection line 122. In this way, the level of the driving voltage 121 is stabilized, and therefore, the switch 112 can be accurately turned on and off.

Figure 2:
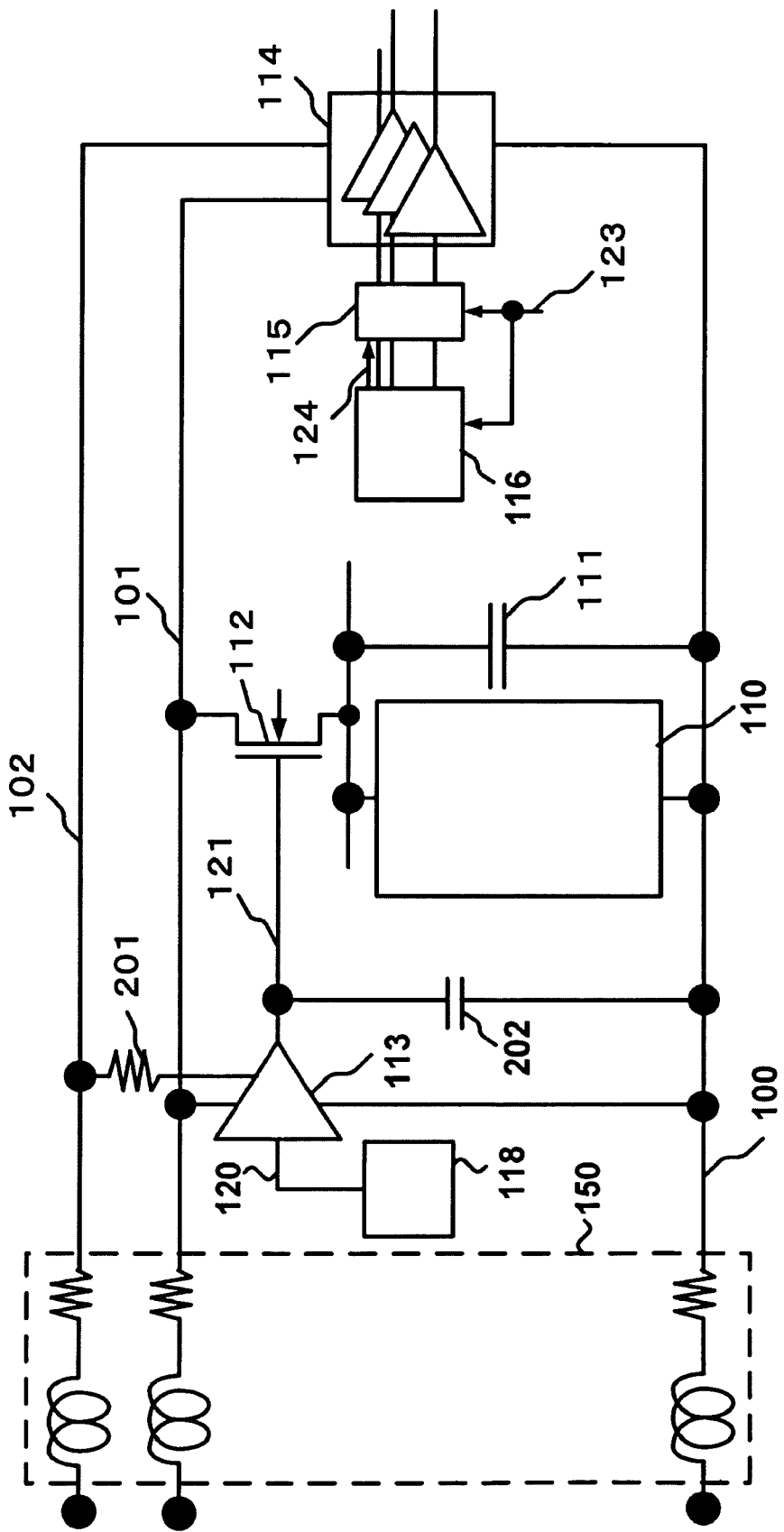
FIG. 2 shows a semiconductor device.

FIG. 2 shows a semiconductor device including the noise blocker 117 shown in FIG. 1 realized by using a resistor element and a capacitor element. Similar numbering will be used in describing FIG. 2 as was utilized above in describing FIG. 1, and descriptions thereof are not repeated. As shown in FIG. 2, a resistor element 201 and a capacitor element 202 form the noise blocker 117 as shown in FIG. 1. The noise blocker 117 serves as a low pass filter. Let R denote the resistance value of the resistor element 201 of the low pass filter, C denote the capacitance value of the capacitor element 202, and T denote the ringing period of SSO noise. Then, R and C are determined so that the following condition:

$$RC > T$$

is satisfied. In this way, propagation of the SSO noise to the switch control unit 113 can be prevented.

Figure 3:
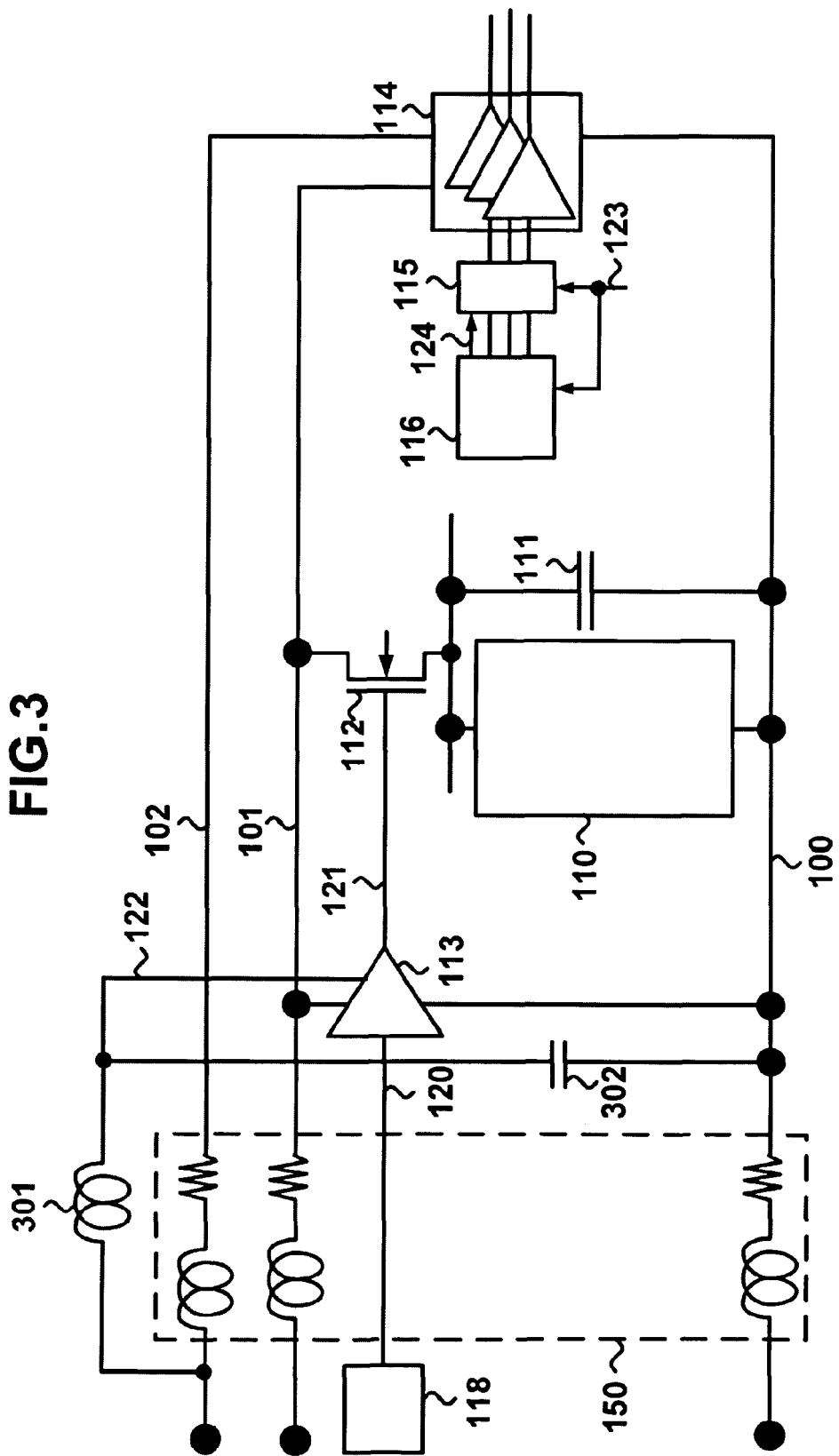
FIG. 3 shows a semiconductor device.

FIG. 3 shows a semiconductor device including the noise blocker 117 shown in FIG. 1 realized by using an inductor element and a capacitor element. Similar numbering will be used in describing FIG. 3 as was utilized above in describing FIG. 1, and descriptions thereof are not repeated. As shown in FIG. 3, an inductor element 301 and a capacitor element 302 form the noise blocker 117 as shown in FIG. 1. The noise blocker 117 serves as a low pass filter. Let L denote the inductance value of the inductor element 301 of the low pass filter, C denote the capacitance value of the capacitor element 302, and T denote the ringing period of SSO noise. Then, L and C are determined so that the following condition:

$$2\pi \times \sqrt{(LC)} > T$$

is satisfied. That is, L and C are determined so that the square root of the product of L and C multiplied by $2\pi$ is greater than T. In this way, propagation of the SSO noise to the switch control unit 113 can be prevented. As described above, according to the present embodiment, a low-power-consumption electronic circuit device having a highly stable power shutoff function can be realized.

When the noise blocker 117 is configured as shown in FIG. 2, the resistor element 201 limits an amount of an electrical current flowing into the switch control unit 113. Accordingly, the switching speed decreases. In contrast, when the noise blocker 117 is configured as shown in FIG. 3, the inductor element 301 requires a large mounted area. Accordingly, the inductor element 301 needs to be mounted in, for example, the package equivalent circuit 150 located outside the semiconductor circuit 151.

Figure 4:
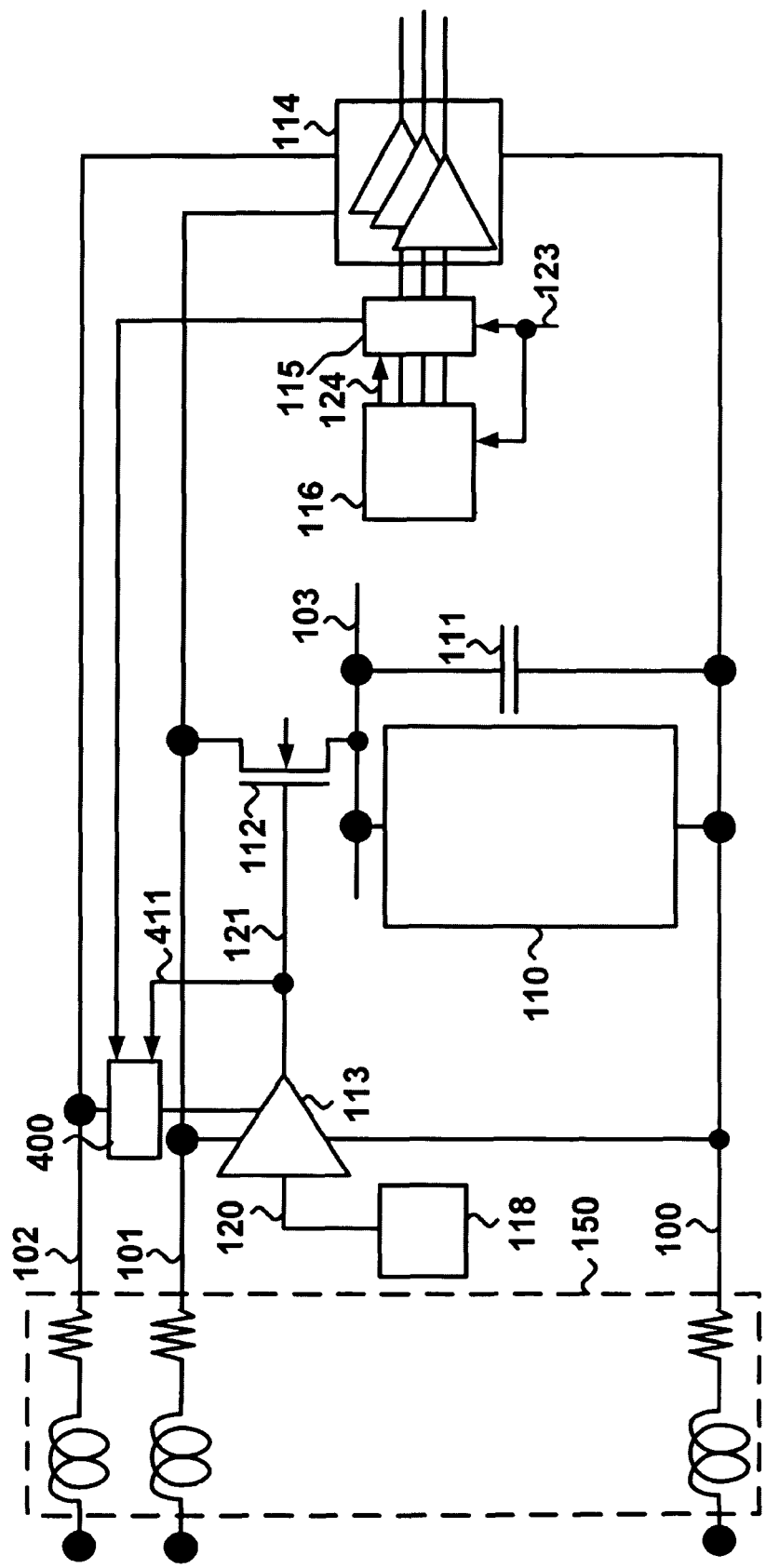
FIG. 4 shows a semiconductor device.

FIG. 4 shows a semiconductor device including a noise blocker 400 operating on the basis of a control signal 410 and a control signal 411. Similar numbering will be used in describing FIG. 4 as was utilized above in describing FIG. 1, and descriptions thereof are not repeated. The control signal 410 is output from a control signal output unit provided in the circuit 115. The control signal 411 is identical to the driving voltage 121 output from the switch control unit 113. The noise blocker 400 turns on and turns off connection between the interconnection line 102 and the switch control unit 113 in response to the control signal 410 and the control signal 411.

A combination of the switch control unit 113 and the noise blocker 400 is defined as a power supply control unit. By controlling the noise blocker 400 on the basis of the control signals 410 and 411, SSO noise can be efficiently blocked without decreasing the switching speed of the switch control unit 113. This operation is described next.

Figure 5:
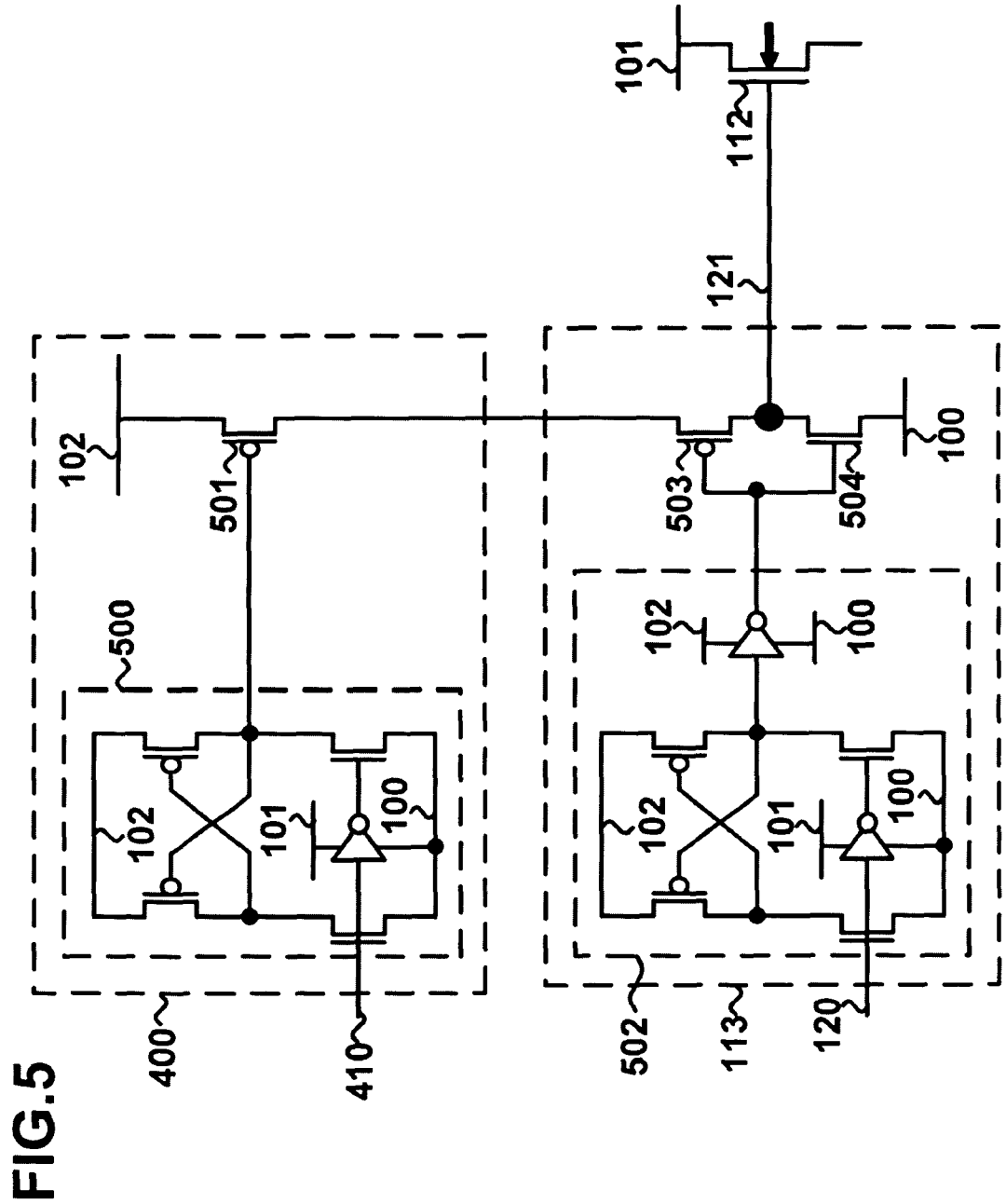
FIG. 5 shows the following circuits in detail: the noise blocker, the switch control unit, and the switch.

FIG. 5 shows the following circuits in detail: the noise blocker 400, the switch control unit 113, and the switch 112. The noise blocker 400 includes a level shift buffer 500 and a P-channel MOS transistor 501. The switch control unit 113 includes a level shift inverter 502, a P-channel MOS transistor 503, and an N-channel MOS transistor 504. A first power supply voltage and a second power supply voltage are supplied to the interconnection lines 100, 101, and 102, as shown in FIG. 5. The switch control unit 113 level-shifts the signal 120 and outputs the driving voltage 121. When the control signal 410 having a high level is input to the noise blocker 400, the P-channel MOS transistor 501 is turned off, thus preventing SSO noise from propagating to the switch control unit 113 via the interconnection line 102. When the P-channel MOS transistor 501 is turned off, power supply to the switch control unit 113 is blocked. In such a blocking mode, the P-channel MOS transistor 503 turns on, while the N-channel MOS transistor 504 turns off. Accordingly, the discharge path of electrical charge charged in a parasitic capacitor formed between the gate and the source of the switch 112 is cut. Therefore, a voltage is applied between the gate and the source of the switch 112 for a certain period of time until the leakage current completely discharges the parasitic capacitance. As a result, a connection state of the switch 112 can be maintained. If it is difficult to maintain the connection state by using only the parasitic capacitance of the switch 112, a capacitor element may be provided between the gate and the source.

FIG. 6A shows a circuit diagram for outputting a control signal when SSO noise is generated. FIG. 6B shows a waveform diagram thereof. FIG. 6A shows the circuits 114 and 115 of the semiconductor device shown in FIG. 4. A control signal output unit 630 shown in FIG. 6A may be an integral part of the circuit 115. The control signal output unit 630 includes a NOT circuit 623. The control signal output unit 630 receives an output enable signal 604 and outputs a signal 606. The circuit 115 receives n signals 601 output from the circuit 116 (not shown) and holds the signals in n registers 621. The number n indicates the number of signals output from the circuit 116. When the output enable signal 124 is input to the circuit 115, a register 620 outputs the output enable signal 604 to the circuit 114 in synchronization with the clock signal 123. At the same time, the n registers 621 output the n signals 605, respectively. At that time, since n level shifters 622 that form the circuit 114 connected to the interconnection line 102 and receiving power from the interconnection line 102 simultaneously operates, SSO noise is superposed on the interconnection line 102. That is, while the output enable signal 604 is being output, SSO noise is generated. Accordingly, by inputting the output enable signal 604 output from the register 620 to the NOT circuit 623 and outputting the signal 606 serving as the control signal 410 to the noise blocker 400, the blocking operation performed when SSO noise is generated can be realized.

FIG. 6B shows the waveforms representing the operation of the circuits shown in FIG. 6A. A waveform 650 represents the SSO noise generated in the interconnection line 102 of the circuit 114. A waveform 651 represents the clock signal 123. A waveform 652 represents a signal 601. A waveform 653 represents the output enable signal 124. A waveform 654 represents the control signal 410. A waveform 655 represents an output signal 605 of the circuit 114. A waveform 657 indicates the state of the P-channel MOS transistor 501 shown in FIG. 5. The waveform 657 includes time periods 657a, 657b, and 657c. In time periods 657a and 657c, the P-channel MOS transistor 501 is turned on. In contrast, in a time period 657b, the P-channel MOS transistor 501 is turned off.

As can be seen from FIG. 6B, when the output enable signal 124 is in an output enable mode and if the signal 601 is input, the output signal 605 is output in synchronization with the clock signal 123. At the same time, SSO noise represented by the waveform 650 is generated. Accordingly, as shown by the waveform 657, the P-channel MOS transistor 501 is turned off during the period in which the SSO noise is generated, that is, during the time in which the output enable signal 604 is input to the circuit 114 so that the waveform 650 is not superposed on the driving voltage 121 of the switch 112. Thus, the operation of the switch 112 is made stable. As a result, the power can be stably supplied to the circuit 110.

In addition, the propagation path of the SSO noise is not limited to the interconnection line 102 for supplying the power. Even when the circuit 114 is driven by a power supply different from that for the switch control unit 113, the SSO noise generated in the circuit 114 may propagate to the switch control unit 113 via a signal line or a ground line. In addition, the SSO noise may be radiated from the circuit 114 in the form of electromagnetic noise. Thus, the SSO noise may be superposed on the driving voltage 121. Even in such a case, by predicting the occurrence of SSO noise and outputting the control signal 410, malfunction due to the noise can be prevented. As described above, according to the present embodiment, a low-power-consumption electronic circuit device having a highly stable power shutoff function can be realized.

In FIG. 6A, the driving voltage 121 of the switch 112 is not supplied while the output enable signal 604 is being output. As the time period in which the driving voltage 121 is not supplied increases, the electrical charge accumulated in the stray capacitor between the gate and the source of the switch 112 is gradually discharged. Accordingly, the switch 112 does not maintain the amplitude of the driving voltage 121, and therefore, the switching state becomes unstable.

Figure 7A:
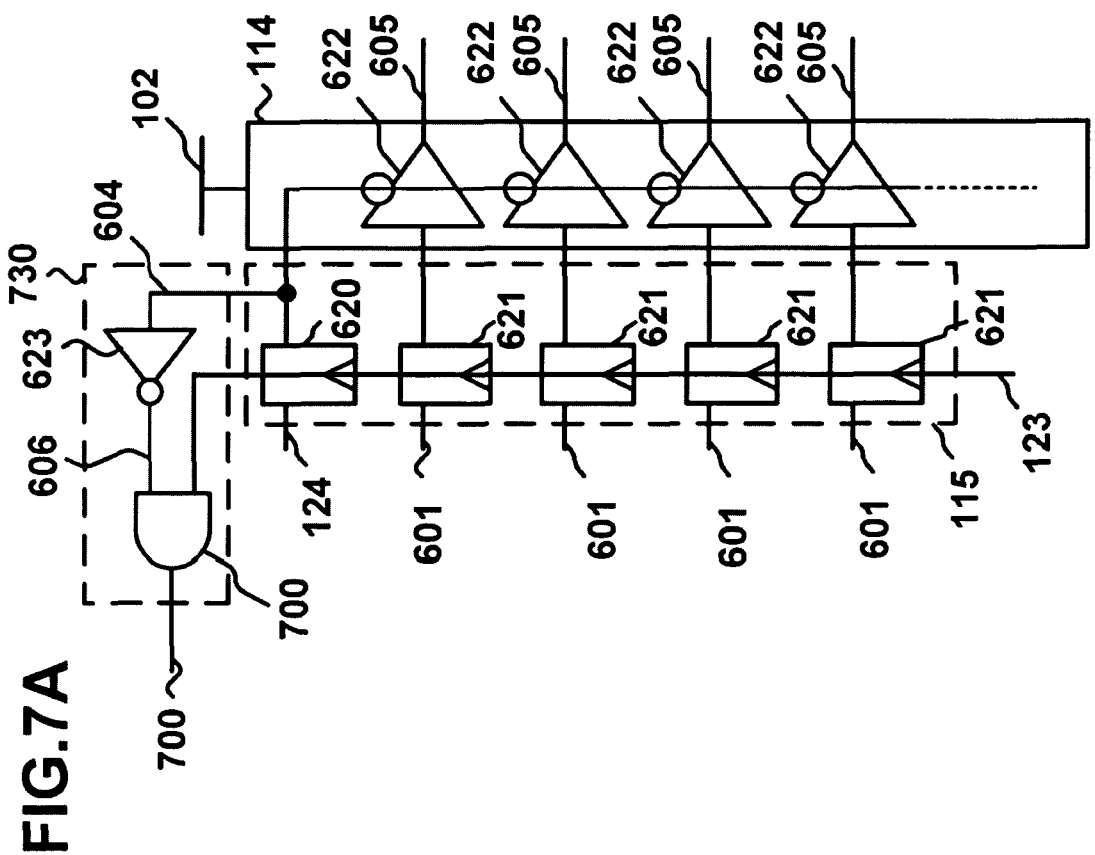
FIG. 7A shows a circuit diagram of a circuit including a control signal output unit.
Figure 7B:
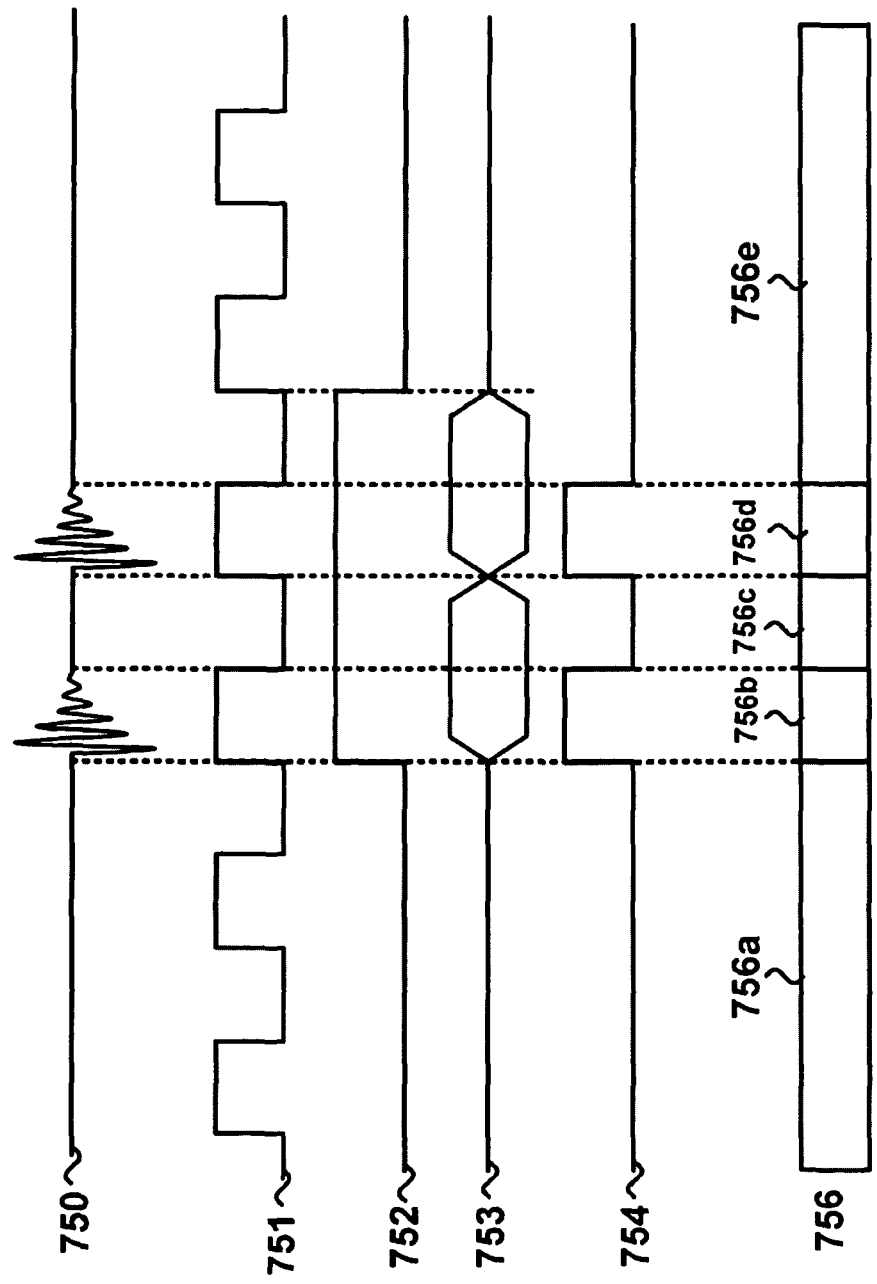
FIG. 7B shows a waveform diagram.

FIG. 7A shows a circuit diagram of a circuit including a control signal output unit for addressing the above-described issue described in FIG. 6A. FIG. 7B shows a waveform diagram thereof. Similar numbering is used in describing FIG. 7A as is utilized above in describing FIG. 6A, and descriptions thereof are not repeated. As shown in FIG. 7A, a control signal output unit 730 includes the control signal output unit 630 shown in FIG. 6A. The control signal output unit 730 further includes an AND circuit 720. The control signal output unit 730 receives the clock signal 123 and the output enable signal 604 and outputs a signal 700. The signal 700 serves as the control signal 410 of the noise blocker 400 shown in FIG. 5.

In FIG. 7B, a waveform 750 represents SSO noise generated in the interconnection line 102 of the circuit 114. A waveform 751 represents the clock signal 123. As can be seen from the comparison between the two waveforms, the SSO noise attenuates in a period shorter than half the period of the clock signal 123. Therefore, the control signal output unit 730 determines the logical AND of the logic of the signal 606 and the logic of the clock signal 123 to be the signal 700. In this way, the control signal can be output only when SSO noise is generated.

In FIG. 7B, a waveform 752 represents the signal 606 of the NOT circuit 623. A waveform 753 represents the output signal 605 of the circuit 114. A waveform 754 represents the signal 700 of the control signal output unit 730. Since the signal 700 serves as the control signal 410 of the noise blocker 400 shown in FIG. 5, the P-channel MOS transistor 501 of the noise blocker 400 turns off while the signal 700 is at a high level. A waveform 756 represents the switching state of the P-channel MOS transistor 501 shown in FIG. 5. The waveform 756 includes time periods 756a, 756b, 756c, 756d, and 756e. During time periods 756a, 756c, and 756e, the P-channel MOS transistor 501 is turned on. In contrast, during time periods 756b and 756d, the P-channel MOS transistor 501 is turned off. Only when SSO noise is generated, the signal 700 serving as a control signal is input to the noise blocker 400 so that propagation of the SSO noise to the switch control unit 113 can be prevented. In this way, a time period in which the power is not supplied to the switch control unit 113 can be decreased, and therefore, the switching operation of the switch 112 can be stabilized. As described above, according to the present embodiment, a low-power-consumption electronic circuit device having a highly stable power shutoff function can be realized.

If the SSO noise attenuation time is further decreased from half the period of the clock signal 123, the stability of the switch 112 can be increased by reducing the blocking time of the noise blocker 400.

Figure 8A:
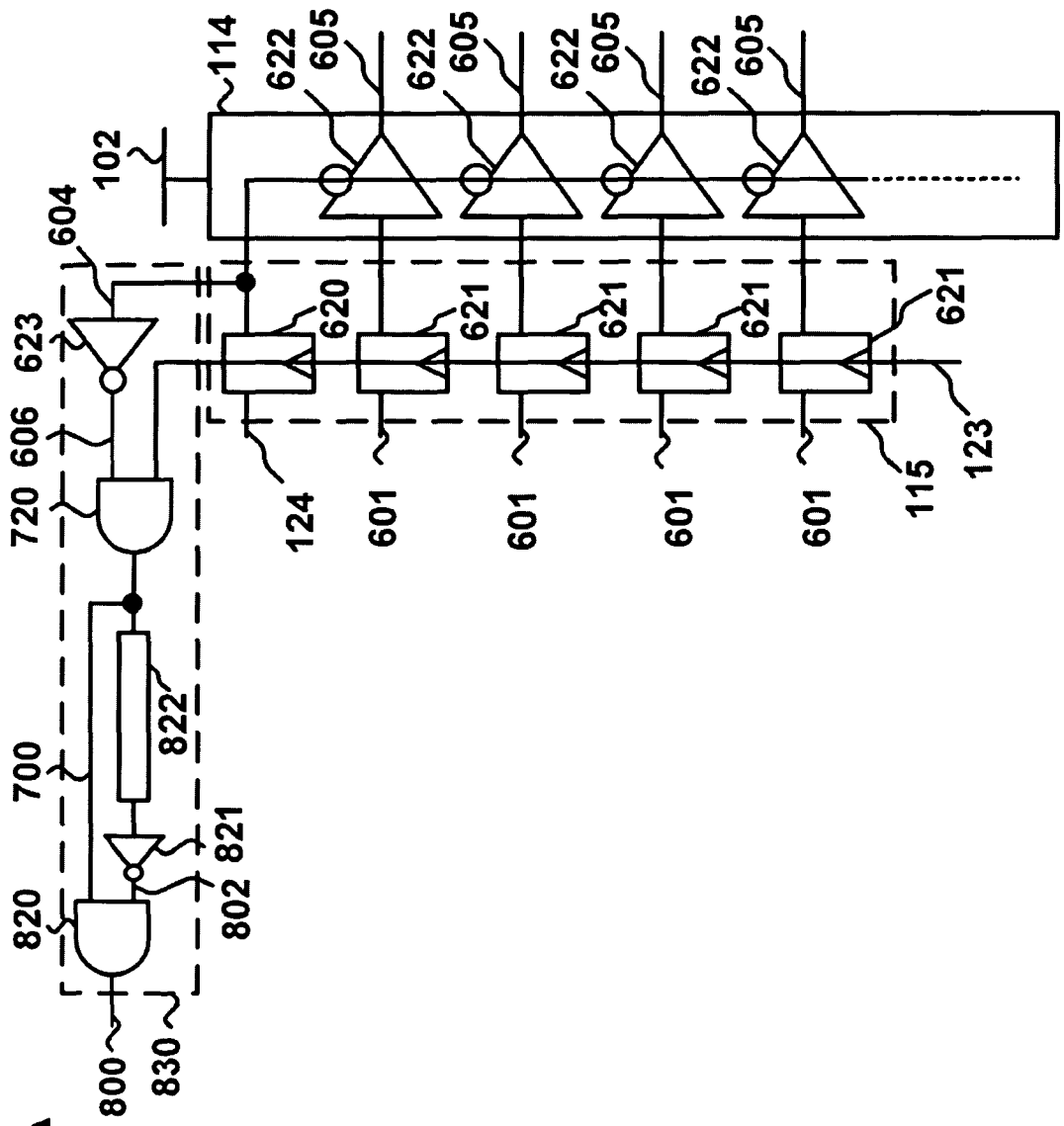
FIG. 8A shows a circuit diagram of a circuit for reducing the blocking time of the noise blocker.

FIG. 8A shows a circuit diagram of a circuit for reducing the blocking time of the noise blocker 400 when the SSO noise attenuation time is further decreased from half the period of the clock signal. FIG. 8B shows a waveform diagram of the operation of the circuit. Similar numbering will be used in describing FIG. 8A as was utilized above in describing FIG. 6A, and descriptions thereof are not repeated. A control signal output unit 830 includes the control signal output unit 730 shown in FIG. 7A. The control signal output unit 830 further includes an AND circuit 820, a NOT circuit 821, and a delay circuit 822. The control signal output unit 830 receives the clock signal 123 and the output enable signal 604 and outputs a signal 800. The signal 700 output from the AND circuit 720 is branched into one of two input signals input to the AND circuit 820 and an input signal input to the delay circuit 822. An output signal of the delay circuit 822 is inverted by the NOT circuit 821 so as to become a signal 802, which is the other input signal input to the AND circuit 820. The AND circuit 820 outputs the signal 800. The signal 800 serves as the control signal 410 of the noise blocker 400 shown in FIG. 5.

In FIG. 8B, a waveform 850 represents SSO noise generated in the power supplying interconnection line 102 of the circuit 114. A waveform 851 represents the clock signal 123. As can be seen from the comparison between the two waveforms, the SSO noise attenuates in a time period shorter than half the period of the clock signal 123. A waveform 852 represents the signal 606. A waveform 853 represents the output signal 605 of the circuit 114. A waveform 854 represents a signal 801. A waveform 855 represents the signal 802. The waveform 855 is obtained by delaying the waveform 854 by a time T1 using the delay circuit 822 and inverting the amplitude of the delayed signal using the NOT circuit 821. A waveform 856 represents the signal 800 output from the AND circuit 820. That is, the waveform 856 represents a logical AND signal of the logic of the signal 700 and the logic of the signal 802. Accordingly, the signal 800 is at a high level for the time T1. Since the signal 800 serves as the control signal 410 of the noise blocker 400 shown in FIG. 5, the P-channel MOS transistor 501 of the noise blocker 400 turns off when the level of the signal 800 is high. A waveform 858 represents the switching state of the P-channel MOS transistor 501 shown in FIG. 5. The waveform 858 includes time periods 858a, 858b, 858c, 858d, and 858e. In time periods 858a, 858c, and 858e, the P-channel MOS transistor 501 is turned on. In contrast, in time periods 858b and 858d, the P-channel MOS transistor 501 is turned off. That is, only when SSO noise is generated for the time T1, the signal 800 serving as a control signal is input to the noise blocker 400. Thus, the SSO noise can be blocked. In this way, a time for shutting off the power supplied to the switch control unit 113 can be decreased, and therefore, the stability of the switching state of the switch 112 can be increased. As described above, according to the present embodiment, a low-power-consumption electronic circuit device having a highly stable power shutoff function can be realized.

When the attenuation time of the SSO noise is longer than the time in which the clock signal is at a high level and the attenuation time is shorter than the clock period, the P-channel MOS transistor 501 of the noise blocker 400 shown in FIGS. 7 and 8 turns on before the SSO noise is completely attenuated. Therefore, the SSO noise propagates to the switch control unit 113.

Figure 9A:
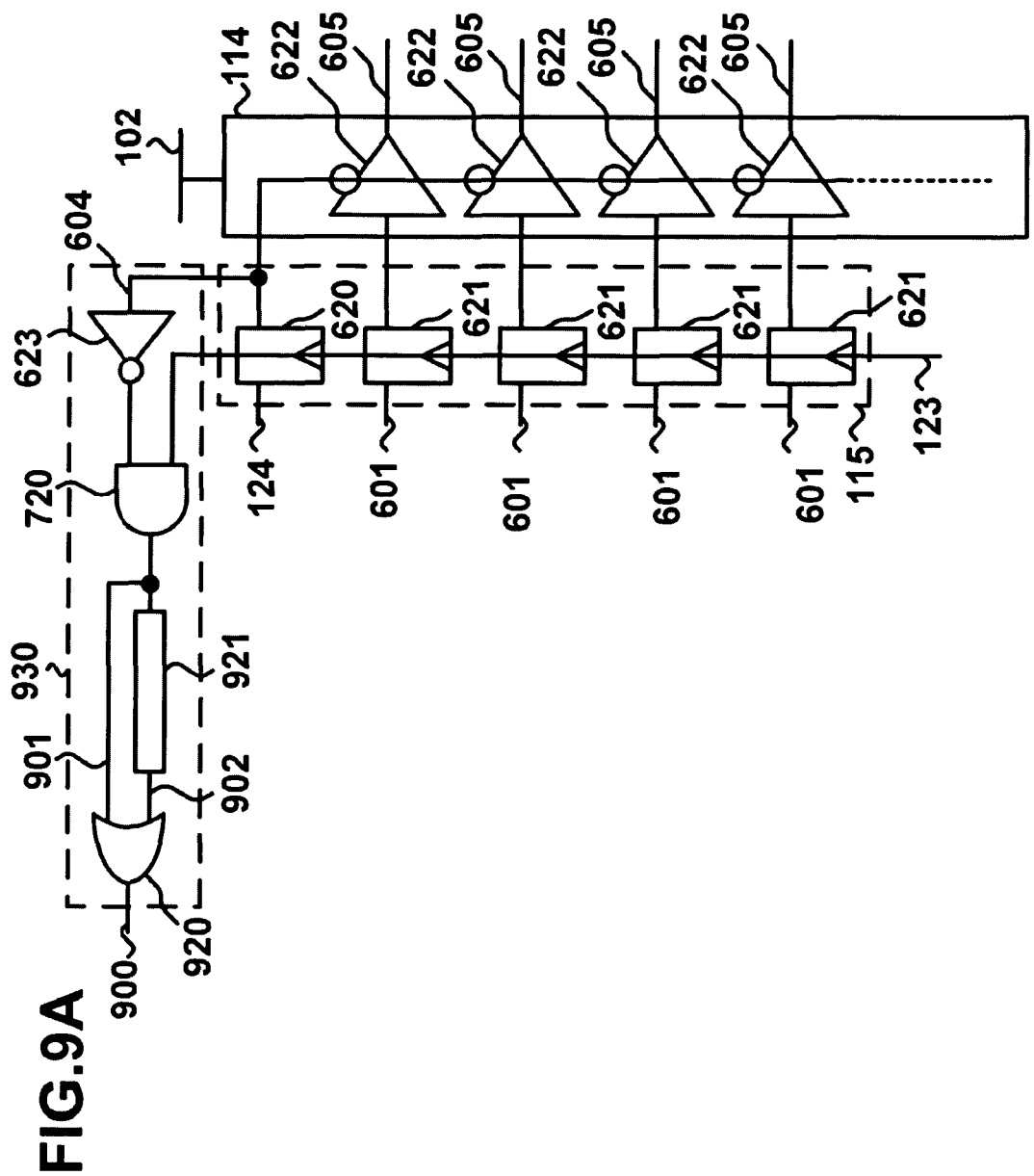
FIG. 9A shows a circuit diagram of a circuit for increasing the blocking time of the noise blocker.

FIG. 9A shows a circuit diagram of a circuit for increasing the blocking time of the noise blocker 400. FIG. 9B shows a waveform diagram thereof. Similar numbering will be used in describing FIG. 9A as was utilized above in describing FIG. 7A, and descriptions thereof are not repeated. A control signal output unit 930 includes the control signal output unit 730 shown in FIG. 7A. The control signal output unit 930 further includes an OR circuit 920 and a delay circuit 921. The control signal output unit 930 receives the clock signal 123 and the output enable signal 604 and outputs a signal 900. An output signal 901 of the AND circuit 720 is branched into one of two input signals input to the OR circuit 920 and an input signal input to the delay circuit 921. An output signal 902 of the delay circuit 921 becomes the other input signal input to the OR circuit 920. The OR circuit 920 outputs the signal 900. The signal 900 serves as the control signal 410 of the noise blocker 400 shown in FIG. 5.

In FIG. 9B, a waveform 950 represents SSO noise generated in the interconnection line 102 for supplying the power to the circuit 114. A waveform 951 represents the clock signal 123. As can be seen from the comparison between the two waveforms, the SSO noise attenuates in a time period longer than the time in which the clock signal 123 is at a high level. A waveform 952 represents the signal 606. A waveform 953 represents the output signal 605 of the circuit 114. A waveform 954 represents the output signal 901. A waveform 955 represents the output signal 902. A waveform 955 represents the waveform 954 delayed by a time T2 using the delay circuit 921. A waveform 956 represents the output signal 900 of the OR circuit 920. That is, the waveform 956 represents a logical AND signal of the logic of the signal 901 and the logic of the signal 902. Accordingly, the output of the control signal output unit 930 is at a high level for a time (T2+T3), which is the sum of a time T3 in which the waveform 951 is at a high level and the delay time T2 imposed by the delay circuit 921. Since the signal 900 serves as the control signal 410 of the noise blocker 400 shown in FIG. 5, the P-channel MOS transistor 501 of the noise blocker 400 turns off when the signal 900 is at a high level. A waveform 958 represents the switching state of the P-channel MOS transistor 501 shown in FIG. 5. The waveform 958 includes time periods 958a, 958b, 958c, 958d, and 958e. In time periods 958a, 958c, and 958e, the P-channel MOS transistor 501 is turned on. In contrast, in time periods 958b and 958d, the P-channel MOS transistor 501 is turned off. That is, only when SSO noise is generated for the time (T2+T3), the signal 900 serving as a control signal is input to the noise blocker 400. Thus, the SSO noise can be blocked. In this way, even when the attenuation time of the SSO noise is longer than the time in which the clock signal is at a high level, a period of time for shutting off the power supplied to the switch control unit 113 can be optimized, and therefore, the stability of the switching state of the switch 112 can be increased. As described above, according to the present embodiment, a low-power-consumption electronic circuit device having a highly stable power shutoff function can be realized.

Figure 10:
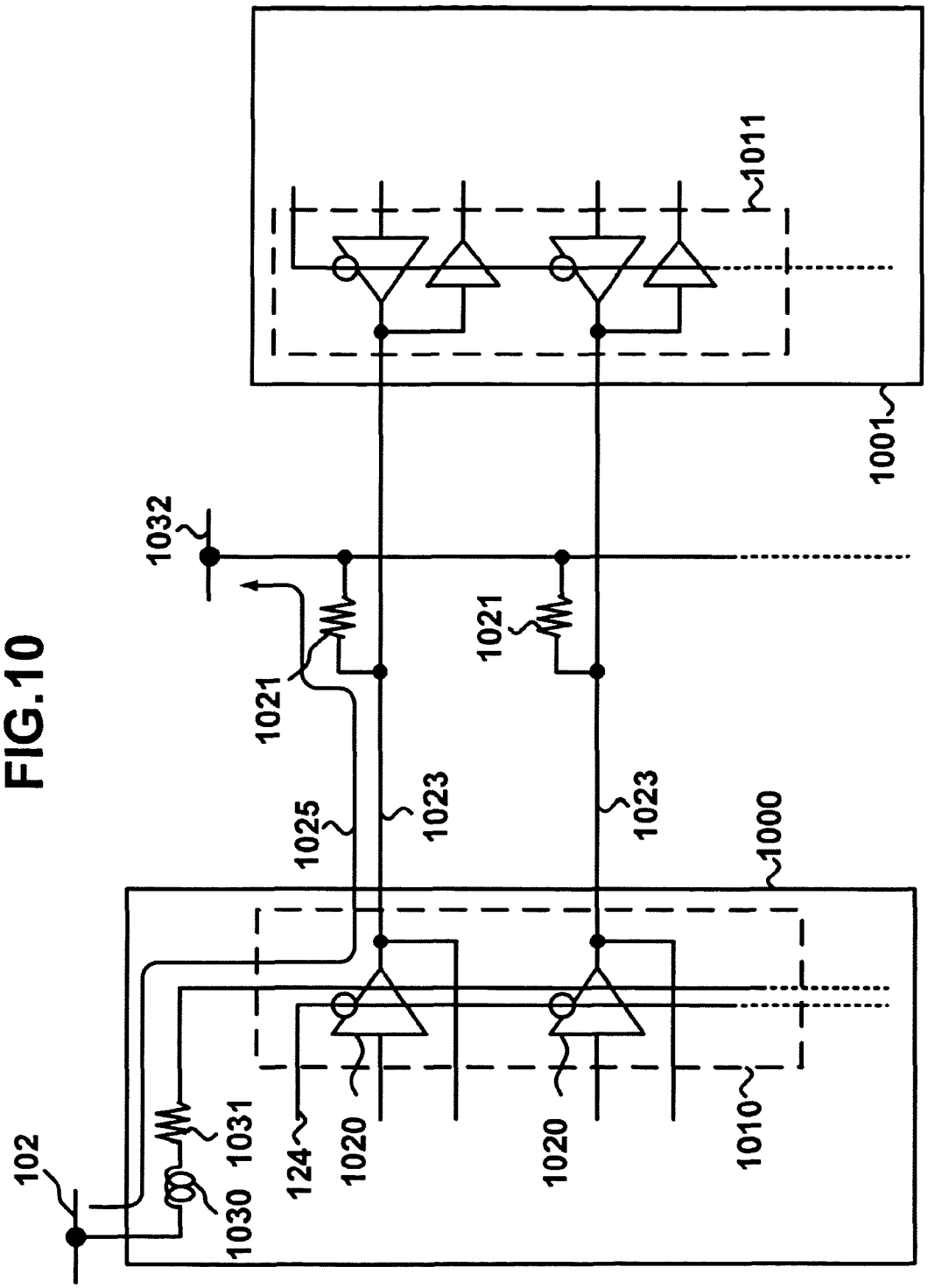
FIG. 10 shows a diagram of a circuit for illustrating rebound noise.

FIG. 10 shows a diagram of a circuit for illustrating rebound noise induced in high-speed transmission, such as that in a terminated low voltage transistor transistor logic (T-LVTTL). A circuit 1010 of a semiconductor device 1000 is connected to a circuit 1011 of a semiconductor device 1001 using m interconnection lines 1023. Here, m is the number of output signals from the semiconductor device 1000. The m interconnection lines 1023 are pulled up at the middle using m resistor elements 1021 by a pull-up voltage 1032 which is, for example, half the second power supply voltage. An inductor element 1030 and a resistor element 1031 represent interconnection lines of a package disposed between a second power supply terminal and the circuit 1010 in the form of an equivalent circuit.

Suppose that an output circuit 1020 outputs a signal having a level "1" when the output enable signal 124 is at a level "0". The output circuit 1020 is one of the m output circuits 1020. At that time, a current 1025 flows into the resistor element 1021 via the inductor element 1030, the resistor element 1031, and the output circuit 1020. Subsequently, when the output enable signal 124 becomes a level "1", the path of the current 1025 is instantaneously cut by the output circuit 1020. Therefore, a circuit transient occurs due to the inductor element 1030 disposed in the path of the current 1025 and parasitic capacitance present in the path of the current 1025. The noise caused by such a circuit transient is referred to as "rebound noise". The above-described operation indicates that the rebound noise is generated after the SSO noise is generated.

FIG. 11A shows a detailed circuit diagram of the output circuit 1020 shown in FIG. 10. FIG. 11B shows a truth table of the output circuit 1020 shown in FIG. 10. As shown in FIG. 11A, the output circuit 1020 includes level shifters 1104 and 1105, an output stage circuit 1106, and a NOT circuit 1107. The amplitudes of an output enable signal 1150 and an input signal 1151 are changed from the amplitude of the first power supply to the amplitude of the second power supply by the level shifters 1104 and 1105, respectively. An output circuit 1020 outputs a signal 1152. The output circuit 1020 is one of the n output circuits 1020 in FIG. 10. The output of the NOT circuit 1107 serves as one of the inputs of a NAND circuit 1108 of the output stage circuit 1106. The output of the level shifter 1105 serves as the other input of the NAND circuit 1108. In addition, the output of the level shifter 1104 serves as one of the inputs of a NOR circuit 1109 of the output stage circuit 1106. The output of the level shifter 1105 serves as the other input of the NOR circuit 1109. In this way, the output circuit 1020 operates as shown in the truth table shown in FIG. 11B.

FIG. 11B is the truth table indicating the operation of the output circuit 1020. When the output enable signal 1150 and the input signal 1151 are at a level "0", the output signal 1152 is at a level "0". When the output enable signal 1150 is at a level "0" and the input signal 1151 is at a level "1", the output signal 1152 is at a level "1". When the output enable signal 1150 is at a level "1", the output of the output circuit 1020 has a high impedance regardless of the level of the input signal 1151.

Figure 12A:
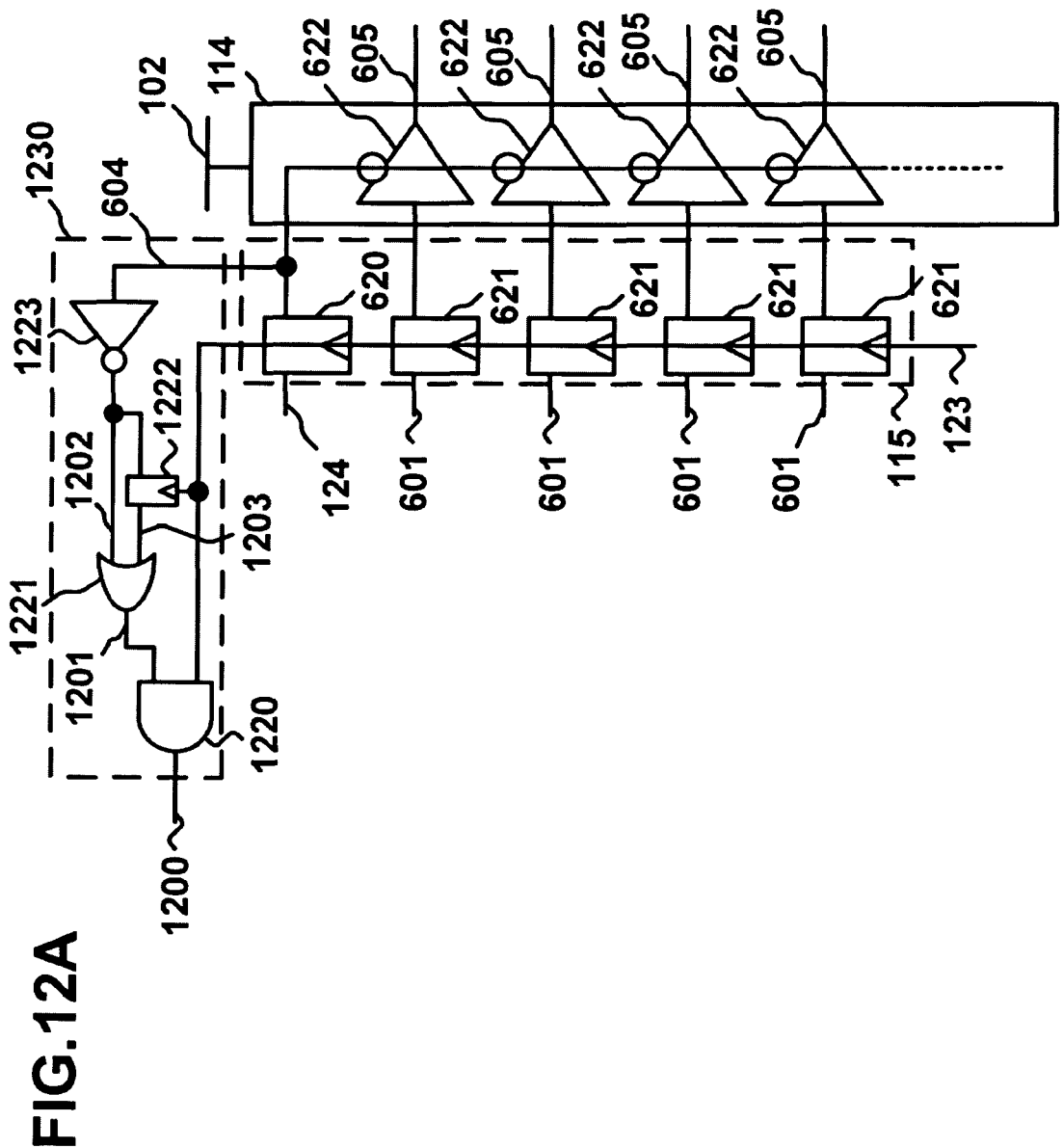
FIG. 12A shows a circuit diagram of a circuit for outputting a control signal for causing the noise blocker.

FIG. 12A shows a circuit diagram of a circuit for outputting a control signal for causing the noise blocker 400 to enter a blocking mode when the SSO noise and the rebound noise illustrated in FIG. 10 are generated. FIG. 12B shows a waveform diagram of the circuit. Similar numbering will be used in describing FIG. 12A as was utilized above in describing FIG. 6A, and descriptions thereof are not repeated. A control signal output unit 1230 includes an AND circuit 1220, an OR circuit 1221, a register 1222, and a NOT circuit 1223. The control signal output unit 1230 receives the clock signal 123 and the output enable signal 604 and outputs a signal 1200. The NOT circuit 1223 receives the output enable signal 604 and outputs a signal 1202. The signal 1202 is branched into a signal directly input to the OR circuit 1221 and a signal input to the OR circuit 1221 via the register 1222. The register 1222 outputs a value held therein to the OR circuit 1221 in synchronization with the clock signal 123. An output signal 1201 of the OR circuit 1221 serves as one of the inputs to the AND circuit 1220. The clock signal 123 serves as the other input to the AND circuit 1220. An output signal 1200 of the AND circuit 1220 serves as the control signal 410 input to the noise blocker 400 shown in FIG. 5.

In FIG. 12B, a waveform 1250 represents power supply noise generated in the power supply interconnection line 102 of the circuit 114. A waveform 1251 represents the clock signal 123. A waveform 1252 represents the signal 1202 output from the NOT circuit 1223. At a time when the waveform 1252 indicates the level "0", rebound noise is induced in the waveform 1250. A waveform 1253 represents the output signal 605 of the circuit 114. A waveform 1254 represents a signal 1203, which is a signal having the waveform 1252 delayed by one period using the register 1222. A waveform 1255 represents the output signal 1201 of the OR circuit 1221. The output signal 1201 is the logical disjunction of the logic of the signal 1202 and the logic of the signal 1203. A waveform 1256 represents the output signal 1200 of the AND circuit 1220. The output signal 1256 is the logical conjunction of the logic of the output signal 1201 and the logic of the clock signal 123.

Since the output signal 1200 serves as the control signal 410 input to the noise blocker 400 shown in FIG. 5, the P-channel MOS transistor 501 of the noise blocker 400 turns off when the signal level of the signal 1200 is "1". A waveform 1258 represents the switching state of the P-channel MOS transistor 501 shown in FIG. 5. The waveform 1258 includes time periods 1258a, 1258b, 1258c, 1258d, 1258e, 1258f, and 1258g. In time periods 1258a, 1258c, 1258e and 1258g, the P-channel MOS transistor 501 is turned on. In contrast, in time periods 1258b, 1258d, and 1258f, the P-channel MOS transistor 501 is turned off. That is, not only SSO noise generated in the interconnection line 102 but also rebound noise can be blocked, and therefore, the stability of the switching state of the switch 112 can be increased.

As described above, according to the present embodiment, a low-power-consumption electronic circuit device having a highly stable power shutoff function can be realized.

Figure 13A:
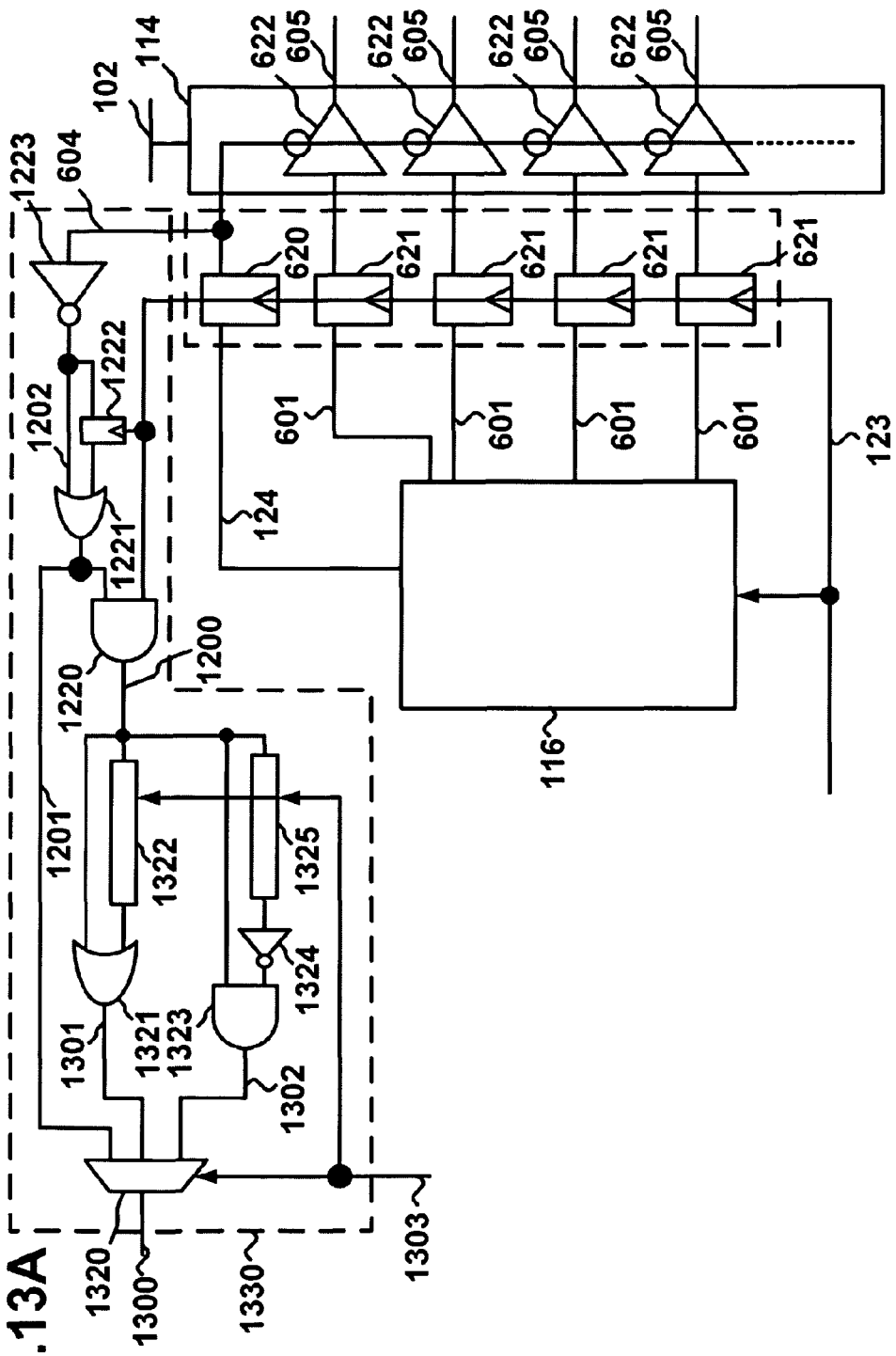
FIG. 13A shows a circuit diagram of a circuit for changing the blocking time period of a control signal.

FIG. 13A shows a circuit diagram of a circuit for changing the blocking time period of a control signal in accordance with the attenuation period of the SSO noise. FIG. 13B shows a truth table used by a selector.

Similar numbering will be used in describing FIG. 13A as was utilized above in describing FIG. 12A, and descriptions thereof are not repeated. A control signal output unit 1330 includes the control signal output unit 1230 shown in FIG. 12A. The control signal output unit 1330 further includes a selector 1320, an OR circuit 1321, delay circuits 1322 and 1325, and an AND circuit 1323, and a NOT circuit 1324. The control signal output unit 1330 receives the clock signal 123 and the output enable signal 604 and outputs a signal 1300. The signal 1300 serves as the control signal 410 input to the noise blocker 400 shown in FIG. 5. The output signal 1200 is branched into one of two input signals input to the OR circuit 1321, a signal input to the delay circuit 1322, one of two input signals input to the AND circuit 1323, and a signal input to the delay circuit 1325. The output of the delay circuit 1322 serves as the other input to the OR circuit 1321. The OR circuit 1321 outputs a signal 1301. The other input signal input to the AND circuit 1323 is the output of the delay circuit 1325 inverted by the NOT circuit 1324. The AND circuit 1323 outputs a signal 1302. The delay times of the delay circuits 1322 and 1325 are set to predetermined values by a select signal 1303.

FIG. 13B shows the truth table of the select signal 1303 input to the selector 1320 and output signal 1300. As shown in FIG. 13B, one of the signals 1201, 1301, and 1302 is output as the signal 1300 in accordance with a combination of bit signals c1 and c2 that form the select signal 1303.

The select signal 1303 is output from, for example, the PMU 118 shown in FIG. 1 in accordance with a change in frequency of the clock signal 123. The selected signal can be determined on the basis of the size relationship between the attenuation period of the noise and the period of the clock signal 123. If the attenuation period of the noise is already known by means of, for example, simulation, the optimal control signal 410 can be output in accordance with a change in frequency of the clock signal 123.

In addition, the attenuation period of the noise changes in accordance with the mounting conditions of the semiconductor device. Accordingly, a certain number of the attenuation periods of the noise may be computed in accordance with some anticipated mounting conditions. The computation results may be stored in a storage unit (not shown) of the semiconductor device. If the mounting condition is determined, an optimal control signal can be selected using the attenuation periods stored in the storage unit.

Let TX denote the pulse width of a clock, and TY denote the attenuation period of noise. Then, a delay time T1 set for the delay circuit 1322 can be optimized using the following equation:

$$T1=TY-TX.$$

In addition, a delay time T2 set for the delay circuit 1325 can be optimized using the following equation:

$$T2=TY.$$

Setting of the delay times for the delay circuits 1322 and 1325 can be performed using the select signal 1303. The setting operation of the delay times is described in more detail below with reference to FIGS. 15A and 15B.

FIGS. 14A to 14C show waveforms representing the operation of the circuit shown in FIG. 13A. FIG. 14A shows the waveforms of the operation of the circuit when the attenuation period of noise is longer than a half period of the clock. FIG. 14B shows the waveforms of the operation of the circuit when the attenuation period of noise is substantially the same as a half period of the clock. FIG. 14C shows the waveforms of the operation of the circuit when the attenuation period of noise is shorter than a half period of the clock. Waveforms 1400, 1410, and 1420 represent power supply noise generated in the interconnection line 102 shown in FIG. 13A. Waveforms 1401, 1411, and 1421 represent the clock signal 123 shown in FIG. 13A. Waveforms 1402, 1412, and 1422 represent the output signal 605 of the circuit 114 shown in FIG. 13A. A waveform 1403 represents the signal 1302. A waveform 1413 represents the signal 1301. A waveform 1423 represents the signal 1201. The selector 1320 is operated on the basis of a relationship between a half period of the clock signal and the attenuation period of noise so that an optimal signal for the noise control signal is selected from among the signals 1201, 1301, and 1302. In this way, even when the clock period is changed, an optimal noise control signal can be generated for the attenuation period of noise.

FIG. 15A shows a circuit diagram of a circuit for changing the delay times of the delay circuits 1322 and 1325 shown in FIG. 13A. FIG. 15B shows a truth table used by the delay circuits 1322 and 1325. As shown in FIG. 15A, a delay circuit 1500 includes selectors 1510, 1511, and 1512 and delay buffers 1520, 1521, and 1522.

The selector 1510 shown in FIG. 15A outputs a signal that does not pass through the delay buffer 1520 when a signal 1530 is "0". However, the selector 1510 outputs a delay signal that passes through the delay buffer 1520 when a signal 1530 is "1". Each of the selectors 1511 and 1512 operates in a similar manner. The delay buffer 1520 has one stage, the delay buffer 1521 has two stages, and the delay buffer 1522 has four stages. As the number of stages increases, the delay time increases.

FIG. 15B shows a relationship between a combination of the signals 1530, 1531, and 1532 and the delay time. The delay time can be changed by changing the combination of the signals 1530, 1531, and 1532. As described above, according to the present embodiment, a low-power-consumption electronic circuit device having a highly stable power shutoff function can be realized.

If the noise blocker 400 operates slowly and does not operate at a timing point at which noise, such as SSO noise, is generated, the noise does not be blocked on time. Accordingly, the operation of the switch 112 may become unstable.

Figure 16A:
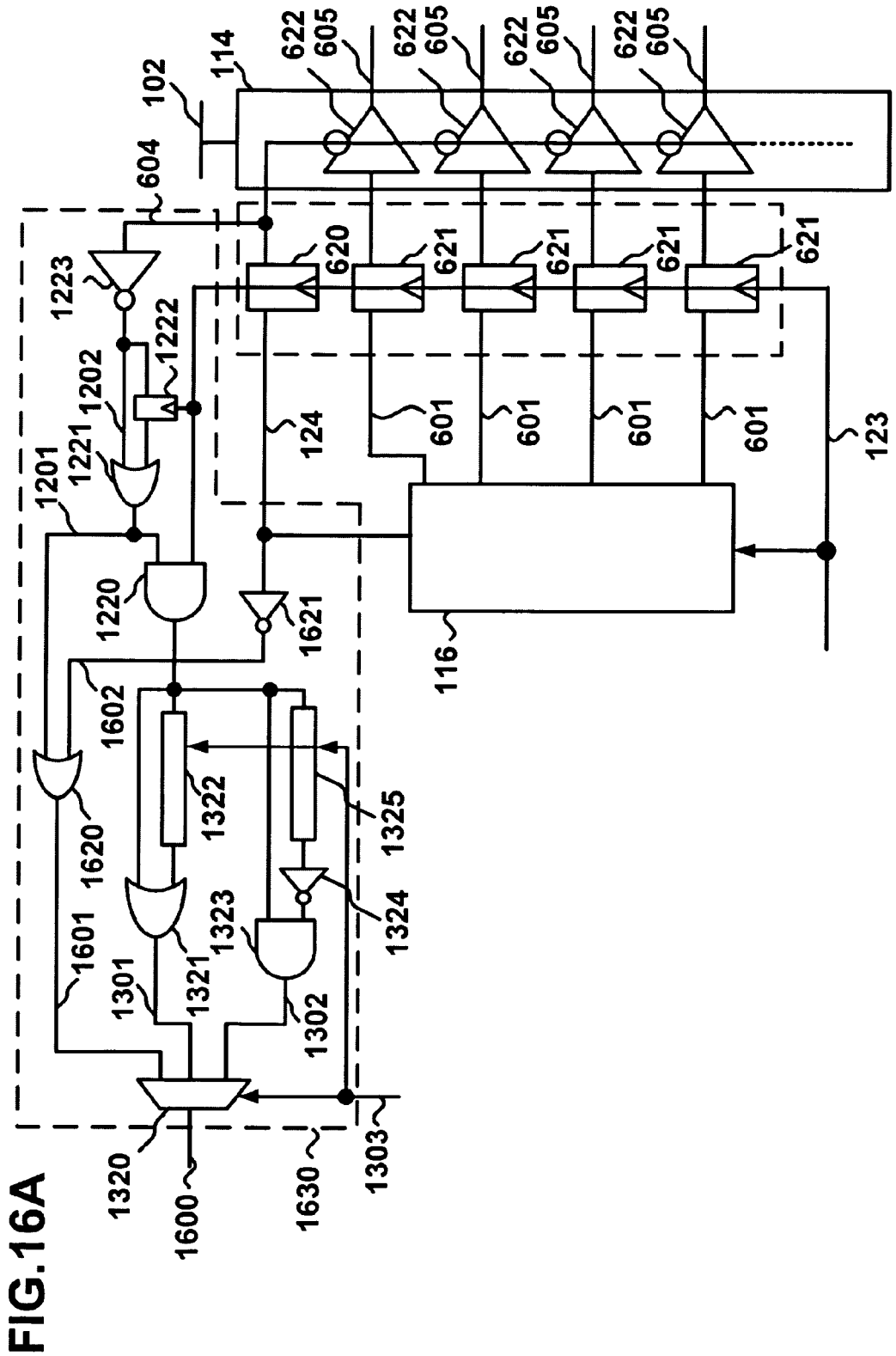
FIG. 16A shows a circuit diagram of a circuit for transmitting a control signal to the noise blocker.

FIG. 16A shows a circuit diagram of a circuit for transmitting a control signal to the noise blocker 400 before noise is generated. FIG. 16B shows a waveform diagram thereof. Similar numbering will be used in describing FIG. 16A as was utilized above in describing FIG. 13A, and descriptions thereof are not repeated. As shown in FIG. 16A, a control signal output unit 1630 includes the control signal output unit 1330 shown in FIG. 13A. The control signal output unit 1630 further includes an OR circuit 1620 and a NOT circuit 1621. The output enable signal 124 passes through the NOT circuit 1621 so as to serve as one of the input signals input to the OR circuit 1620. The output signal 1201 of the OR circuit 1221 serves as the other input signal input to the OR circuit 1620. The OR circuit 1620 outputs a signal 1601.

In FIG. 16B, a waveform 1650 represents noise in the interconnection line 102. A waveform 1651 represents the clock signal 123. A waveform 1652 represents the output signal of the circuit 114. A waveform 1653 represents the output signal 1201. A waveform 1654 represents the signal 1602. A waveform 1655 represents the signal 1601.

The output enable signal 124 output from the circuit 116 shown in FIG. 16A is input to the NOT circuit 1621 without passing through the register 620 and is output as a signal 1602. Accordingly, the timing point at which the level of the signal 1602 becomes "1" is earlier than the timing point at which the output signal 1201 changes. Therefore, the signal 1601 output from the OR circuit 1620 is represented by a waveform 1655. Thus, a control signal can be transmitted to the noise blocker 400 before noise, such as SSO noise, is generated. In this way, according to the present embodiment, a low-power-consumption electronic circuit device having a highly stable power shutoff function can be realized.

Figure 17:
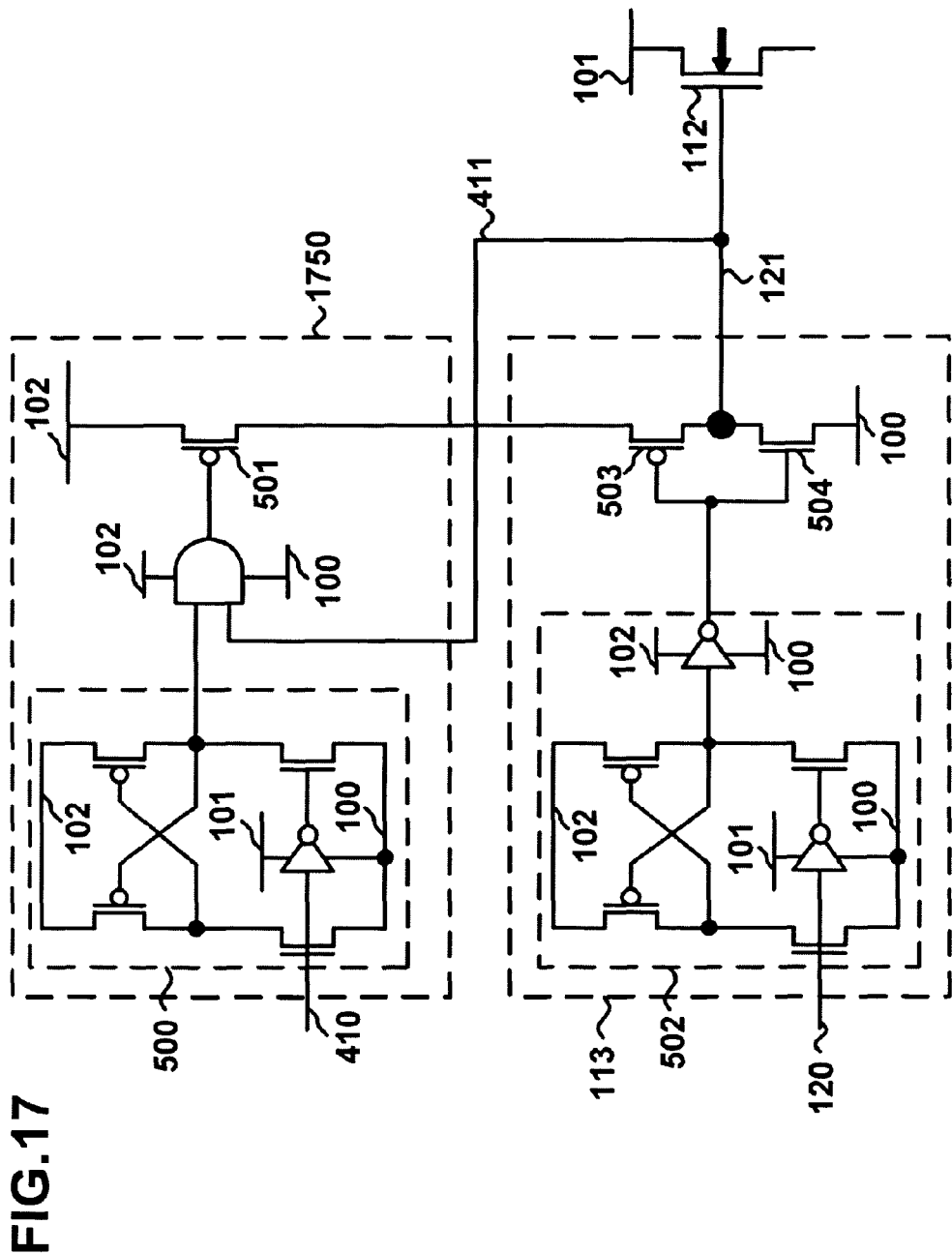
FIG. 17 shows a circuit diagram of a noise blocker.

FIG. 17 shows a circuit diagram of a noise blocker operated on the basis of the driving voltage 121. Similar numbering will be used in describing FIG. 17 as was utilized above in describing FIG. 5, and descriptions thereof are not repeated. A noise blocker 1750 shown in FIG. 17 is different from the noise blocker 400 shown in FIG. 5 in that the noise blocker 1750 includes an AND circuit 1710 and the control signal 411. This configuration allows the noise blocker 1750 to perform a blocking operation only when the switch 112 is in a conductive state. When the switch 112 is in a blocking state, the P-channel MOS transistor 501 enters a conductive state. In this way, when the switch 112 changes to a conductive state, the power has already been supplied to the switch control unit 113. Accordingly, the transit speed of the switch 112 can be increased.

FIG. 18A shows a circuit diagram illustrating the operation of the noise blocker 1750 when taking into account the control signal 411 shown in FIG. 17. FIG. 18B shows a waveform diagram thereof. Similar numbering will be used in describing FIG. 18A as was utilized above in describing FIG. 6A, and descriptions thereof are not repeated.

In FIG. 18B, waveforms 1850 and 1852 represent the operating state of the P-channel MOS transistor 501 shown in FIG. 17. The waveform 1851 represents the operating state of the P-channel MOS transistor 501 when the switch 112 turns on. The waveform 1851 includes time periods 1851a, 1851b, and 1851c. In time periods 1851a and 1851c, the P-channel MOS transistor 501 is turned on. In a time period 1851b, the P-channel MOS transistor 501 is turned off.

In contrast, when the switch 112 turns off, the circuit 110 does not malfunction even if noise propagates to the switch 112. Accordingly, the need for blocking the noise is not high. The waveform 1852 represents the operating state of the P-channel MOS transistor 501 when the switch 112 turns off. When the switch 112 turns off, the P-channel MOS transistor 501 always turns on regardless of the level of the control signal 410. In this way, when the switch 112 changes to a conductive state, the power has already been supplied to the switch control unit 113. Accordingly, the transit speed of the switch 112 can be increased. As described above, according to the present embodiment, a low-power-consumption electronic circuit device having a highly stable power shutoff function can be realized.

The method for causing the noise blocker 400 to enter a blocking state using the output enable signal of the circuit 116 is based on generation of noise when the output enable signal is output. Therefore, if unexpected noise is induced, the switch 112 may malfunction due to such noise.

Figure 19:
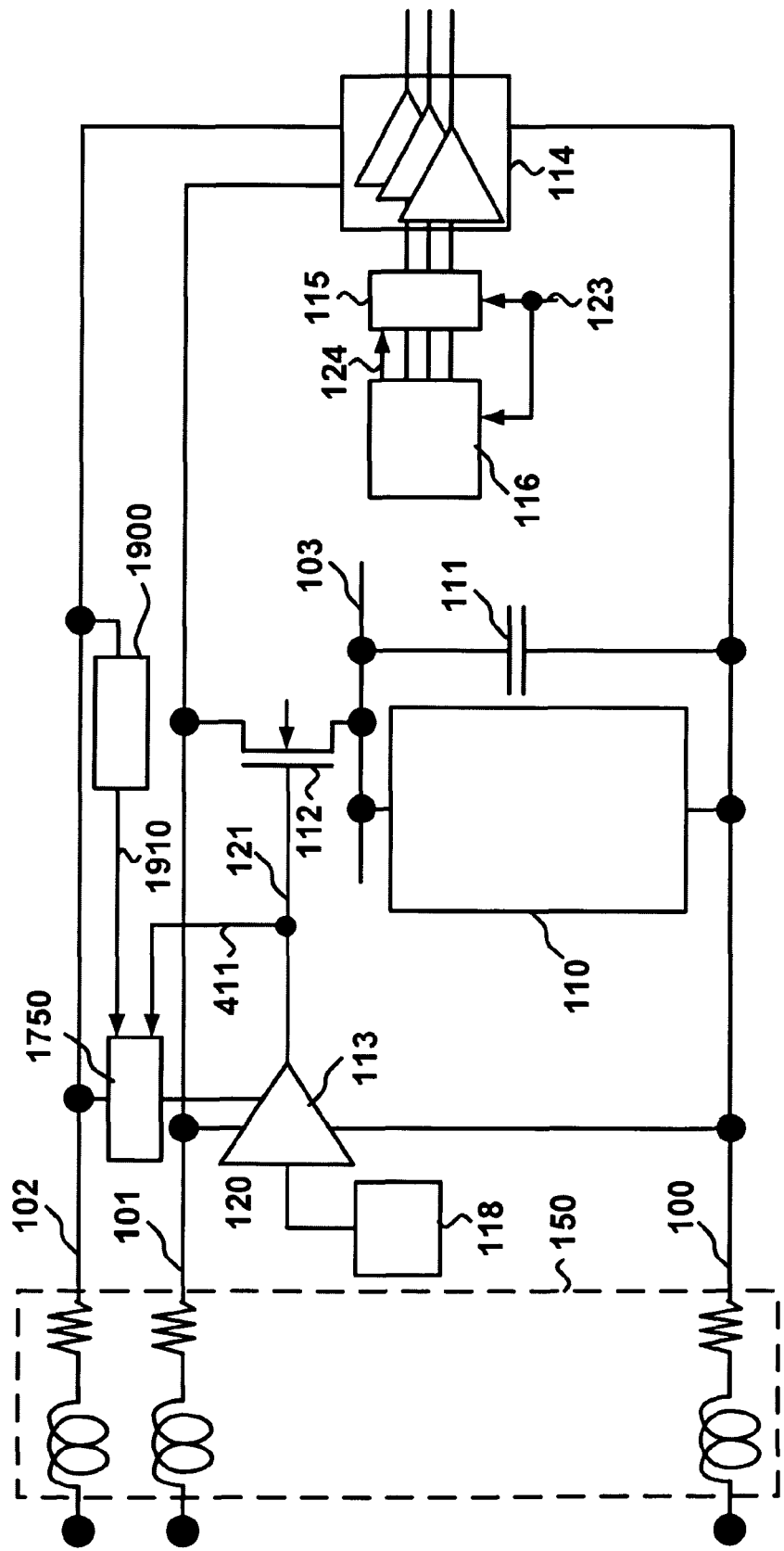
FIG. 19 shows a circuit diagram of a circuit for operating the noise blocker.

FIG. 19 shows a circuit diagram of a circuit for operating the noise blocker 400 when noise greater than or equal to a predetermined threshold value is induced in the interconnection line 102. Similar numbering will be used in describing FIG. 19 as was utilized above in describing FIG. 4, and descriptions thereof are not repeated. The circuit shown in FIG. 19 is different from the circuit shown in FIG. 4 in that the circuit includes a control signal output unit 1900 that outputs a control signal 1910.

The control signal output unit 1900 monitors the voltage level of the interconnection line 102. If the voltage level decreases to a value less than or equal to a predetermined value, the control signal output unit 1900 outputs the control signal 1910.

Figure 20:
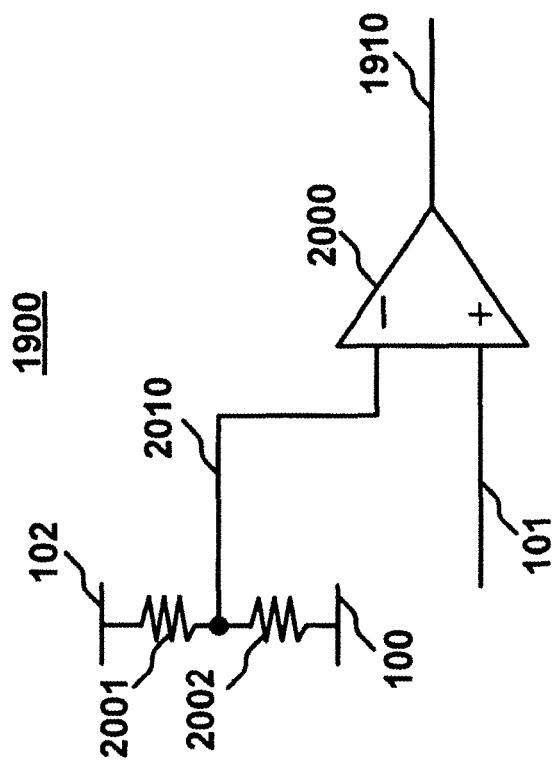
FIG. 20 shows an exemplary circuit diagram of the control signal output unit.

FIG. 20 shows an exemplary circuit diagram of the control signal output unit 1900. The control signal output unit 1900 includes a difference amplifier 2000 and resistor elements 2001 and 2002. The amplitude of a signal 2010 is determined by the voltage of the interconnection line 102, with reference to the interconnection line 100, divided by the resistor elements 2001 and 2002. In order to set the positive terminal of the difference amplifier 2000 to a constant potential, the positive terminal is connected to, for example, the interconnection line 101 so as to have a potential the same as that of the interconnection line 101. Accordingly, if the potential of the signal 2010 is lower than that of the interconnection line 101, the difference amplifier 2000 outputs a signal of "1". However, if the potential of the signal 2010 is higher than or equal to that of the interconnection line 101, the difference amplifier 2000 outputs a signal of "0".

Figure 21:
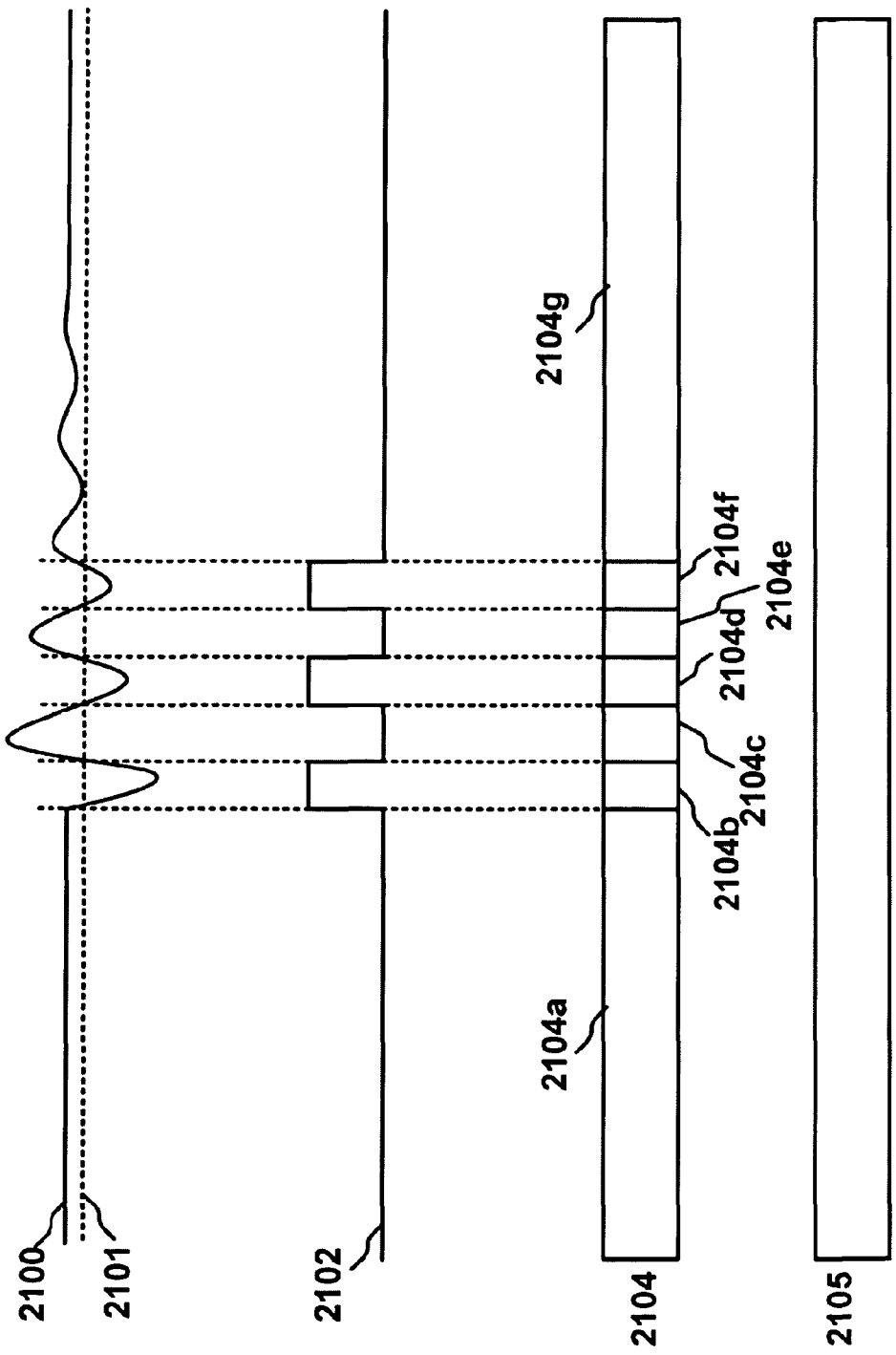
FIG. 21 shows an operating waveform diagram.

FIG. 21 shows an operating waveform diagram illustrating the noise blocking operation shown in FIG. 19. A waveform 2100 represents a noise signal induced on the interconnection line 102. A waveform 2101 represents a threshold voltage determined by the control signal output unit 1900. A waveform 2102 represents the control signal 1910 output from the control signal output unit 1900. The waveform 2102 becomes "1" when the waveform 2100 is less than or equal to the threshold voltage. The waveforms 2103 and 2105 represent the state of the P-channel MOS transistor 501 shown in FIG. 17.

A waveform 2104 represents the state of the P-channel MOS transistor 501 when the switch 112 turns on. The waveform 2104 includes time periods 2104a, 2104b, 2104c, 2104d, 2104e, 2104f, and 2104g. Time periods 2104a, 2104c, 2104e, and 2104g represent time periods during which the P-channel MOS transistor 501 is turned on. Time periods 2104b, 2104d, and 2104f represent time periods during which the P-channel MOS transistor 501 is turned off. In this way, the noise blocker 1750 can be controlled in accordance with the amplitude of the noise signal generated in the interconnection line 102, and therefore, the operation of the switch 112 can be stabilized.

A waveform 2105 represents the state of the P-channel MOS transistor 501 when the switch 112 turns off. At that time, the P-channel MOS transistor 501 always stays on regardless of the level of the control signal 1910. In this way, when the switch 112 changes to a conductive state, the power has already been supplied to the switch control unit 113. Accordingly, the transit speed of the switch 112 can be increased. As described above, according to the present embodiment, a low-power-consumption electronic circuit device having a highly stable power shutoff function can be realized.

Figure 22:
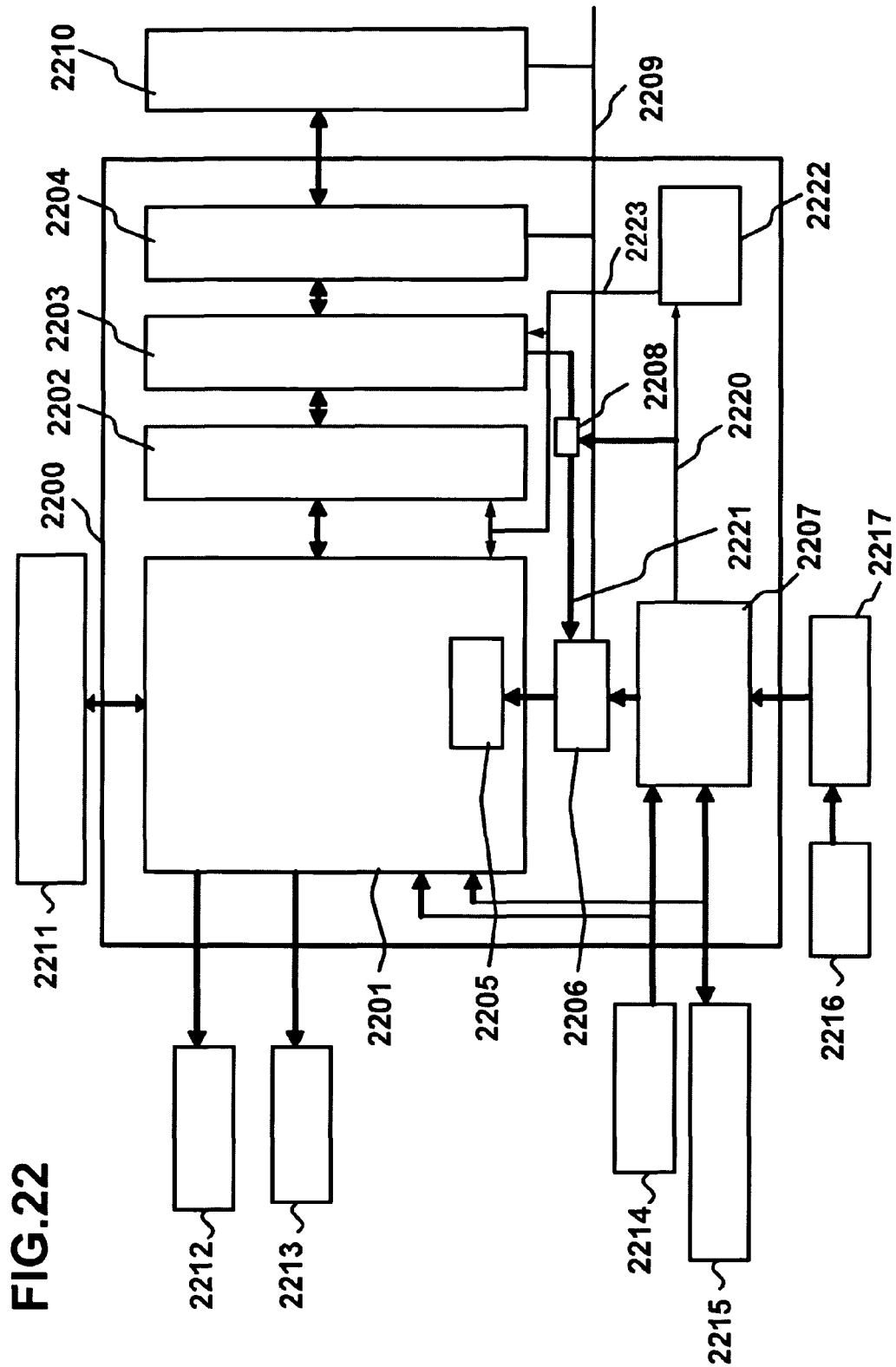
FIG. 22 shows a block diagram of the electronic circuit device applied to a cell phone.

FIG. 22 shows a block diagram of the electronic circuit device applied to a cell phone according to an eleventh exemplary embodiment. While the present embodiment is described with reference to a cell phone, the electronic circuit device according to an eleventh exemplary embodiment can be applied to other information communications apparatuses. In FIG. 22, a system on chip (SOC) 2200 provides principal functions of a cell phone. The SOC 2200 includes a central processing unit (CPU) 2201, a memory controller 2202, a memory IO port 2203, a memory IO 2204, a switch 2205, a power control unit 2206, a PMU 2207, a control signal output unit 2208, and a clock generation circuit 2222. A main memory 2210, a non-volatile memory 2211, an alarm display unit 2212, a display 2213, a key input unit 2214, an information communications unit 2215, a battery 2216, and a battery level detection unit 2217 are connected to the SOC 2200. In addition, a power supply 2209 is connected to the memory IO 2204, the power control unit 2206, and the main memory 2210. The clock generation circuit 2222 can generate clock signals of a plurality of different frequencies. The clock generation circuit 2222 supplies a clock signal 2223 of a frequency selected by a selection signal 2220 to the CPU 2201, the memory controller 2202, and the memory IO port 2203.

The PMU 2207 transmits a driving voltage to the power control unit 2206 in response to a signal input from the key input unit 2214 to the PMU 2207. The power control unit 2206 level-shifts the driving voltage so that the switch 2205 enters a connection mode. Thus, the CPU 2201 returns from a ready state.

The information communications unit 2215 communicates information with other apparatuses. When the information communications unit 2215 starts communication of information, the PMU 2207 starts supplying the power to the CPU 2201. The CPU 2201 starts processing required for the information communication. In accordance with the load of the information communication, the PMU 2207 changes the selection signal 2220 so that the frequency of the clock signal 2223 supplied from the clock generation circuit 2222 to the CPU 2201, the memory controller 2202, and the memory IO port 2203 is changed. In addition, using the selection signal 2220, the control signal output unit 2208 selects an optimal control signal 2221.

When the battery level detection unit 2217 detects a decrease in the battery level of the battery 2216, the PMU 2207 outputs a signal instructing that the supplying of power to the CPU 2201 be stopped. The CPU 2201 outputs a signal instructing display of an alarm to the alarm display unit 2212.

When the power is supplied to the CPU 2201 and if the optimal control signal 2221 is transmitted from the control signal output unit 2208 to the power control unit 2206, the power control unit 2206 blocks the output of a control signal to the switch 2205. Thus, propagation of noise superposed on the voltage supplied by the power supply 2209 due to the operation of the memory IO 2204 to the switch 2205 can be prevented, and therefore, malfunction of the switch 2205 can be prevented.

Furthermore, suppose that display of a moving picture is instructed through the information communications unit 2215 when a still image is displayed on the display 2213. Since processing of a moving image needs to be performed faster than that of a still image, the PMU 2207 sends an instruction to the clock generation circuit 2222 using the selection signal 2220 in order to increase the frequency of the operating clock of the CPU 2201 and the memory controller 2202. As illustrated in FIGS. 13A and 13B, it is desirable that the optimal control signal 2221 is selected in accordance with the clock speed. The control signal output unit 2208 selects an optimal control signal 2221 on the basis of the selection signal 2220 output from the PMU 2207 and outputs the selected control signal 2221. As described above, according to the present embodiment, a low-power-consumption electronic circuit device having a highly stable power shutoff function can be realized.

What is claimed is:

1. An electric circuit device operable under a first power supply comprising:
    a first circuit;
    a switch connecting a first circuit with the first power supply;
    a second circuit, coupled to the first power supply and a second power supply which is different from the first power supply, to generate a signal output;
    a noise blocker, coupled to the second power supply, to output a cut-off signal;
    a control signal output circuit to output a control signal based on the signal output of the second circuit and the cut-off signal,
    wherein while the first circuit is supplied with a first power supply voltage via the switch by supplying of a driving voltage to the switch, the supply of the driving voltage is temporarily cut off in response to the control signal.

2. The electric circuit device of claim 1, further comprising a third circuit to supply a switch control signal to the control signal output circuit.

3. The electric circuit device of claim 1, wherein the control signal output circuit includes a level shifter to convert the signal output from the first power supply voltage to the second power supply voltage.

4. The electric circuit device of claim 1, wherein the noise blocker cuts off the connection of the second power supply and the switch controller in accordance with the amplitude of the control signal.

5. The electric circuit device of claim 1, wherein the switch includes a MOS transistor connecting the first circuit and the first power supply in accordance with the control signal, and the MOS transistor has a capacitance keeping an voltage of the control signal between the gate and the source.

6. The electric circuit device of claim 5, further comprising a capacitor for keeping the voltage between the gate and the source of the MOS transistor.

7. The electric circuit device of claim 1, wherein the control signal output unit outputs the control signal intermittently when the second circuit produces the signal output in accordance with a clock signal.

8. The electric circuit device of claim 7, wherein
    the control signal output unit is controlled based on an enabling signal for the second circuit and the clock signal.

9. The electric circuit device of claim 8, further comprising,
    a logical AND circuit to receive the clock signal and a signal based on the enable signal.

10. An electric circuit device operable under a first power supply comprising:
    a first circuit;
    a switch connecting the first circuit with the first power supply;
    a second circuit connected with a second power supply;
    a control signal output unit for outputting a control signal in accordance with a second power supply voltage and a threshold voltage,
    wherein the first circuit is supplied with the first power supply voltage via the switch by supplying of a driving voltage to the switch, the supply of the driving voltage is temporarily cut off in response to the control signal output by the control signal output unit when the second power supply voltage is less than or equal to the threshold voltage; and
    when the second power supply voltage is greater than the threshold voltage, the supply of the driving voltage is maintained.

11. The electric circuit device of claim 10, wherein the control signal output unit includes a difference amplifier for receiving the first power supply voltage as a first input and for receiving the divided voltage of the second power supply voltage as a second input and for outputting the control signal.

* * * * *